US011635467B2

(12) United States Patent
Ukumori

(10) Patent No.: US 11,635,467 B2
(45) Date of Patent: Apr. 25, 2023

(54) EVALUATION DEVICE, COMPUTER PROGRAM, AND EVALUATION METHOD

(71) Applicant: GS Yuasa International Ltd., Kyoto (JP)

(72) Inventor: Nan Ukumori, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 0 days.

(21) Appl. No.: 17/755,938

(22) PCT Filed: Nov. 17, 2020

(86) PCT No.: PCT/JP2020/042687
§ 371 (c)(1),
(2) Date: May 12, 2022

(87) PCT Pub. No.: WO2021/100673
PCT Pub. Date: May 27, 2021

(65) Prior Publication Data
US 2022/0381831 A1    Dec. 1, 2022

(30) Foreign Application Priority Data

Nov. 18, 2019    (JP) .............................. JP2019-208083

(51) Int. Cl.
*G06F 11/30*    (2006.01)
*G01R 31/367*    (2019.01)
(Continued)

(52) U.S. Cl.
CPC ......... *G01R 31/367* (2019.01); *G01R 31/388* (2019.01); *G01R 31/3842* (2019.01);
(Continued)

(58) Field of Classification Search
CPC .................................................. G01R 31/367
See application file for complete search history.

(56) References Cited

U.S. PATENT DOCUMENTS

| 2011/0184575 A1* | 7/2011 | Kawamoto ........... H04L 67/125 |
| | | 714/49 |
| 2021/0048482 A1 | 2/2021 | Ukumori |
| 2021/0255251 A1 | 8/2021 | Ukumori |

FOREIGN PATENT DOCUMENTS

| JP | H11-14507 A | 1/1999 |
| JP | 2008-268042 A | 11/2008 |

(Continued)

OTHER PUBLICATIONS

International Search Report and Written Opinion for PCT Application No. PCT/JP2020/042687, dated Jan. 19, 2021, (9 pages), Japan Patent Office, Tokyo, Japan.

*Primary Examiner* — Phuong Huynh
(74) *Attorney, Agent, or Firm* — Alston & Bird LLP

(57) ABSTRACT

This evaluation device comprises: a mathematical model acquisition unit that acquires a mathematical model expressing the state of a power storage element; an operation data acquisition unit that acquires operation data which includes time-series input data input during operation of a system constructed on the basis of the numerical model, and time-series output data output by the system on the basis of the time-series input data; a processing unit that inputs the time-series input data to the numerical model and executes processing causing time-series model output data to be output from the numerical model; and an evaluation unit that evaluates the design and the operation of the system on the basis of the time-series output data and the time-series model output data.

11 Claims, 18 Drawing Sheets

(51) Int. Cl.
    *G01R 31/392*     (2019.01)
    *G01R 31/3842*     (2019.01)
    *G01R 31/388*     (2019.01)
    *H02J 13/00*     (2006.01)
    *H01M 10/48*     (2006.01)
    *H02J 7/00*     (2006.01)

(52) U.S. Cl.
    CPC ........ *G01R 31/392* (2019.01); *H01M 10/486* (2013.01); *H02J 13/00002* (2020.01); *H02J 7/005* (2020.01); *H02J 7/0049* (2020.01)

(56) References Cited

FOREIGN PATENT DOCUMENTS

| | | | |
|---|---|---|---|
| JP | 2011-154410 A | | 8/2011 |
| JP | 2011154410 | * | 8/2011 |
| JP | 2015-059933 A | | 3/2015 |
| JP | 2018-147680 A | | 9/2018 |
| JP | 2018-173370 A | | 11/2018 |
| JP | 2018173370 | * | 11/2018 |
| JP | 6590029 B1 | | 10/2019 |
| WO | WO-2019/181727 A1 | | 9/2019 |

* cited by examiner

Temperature distribution of energy storage cell

Behavior of energy storage device by environmental difference

Behavior of energy storage device by environmental difference

Fig. 16

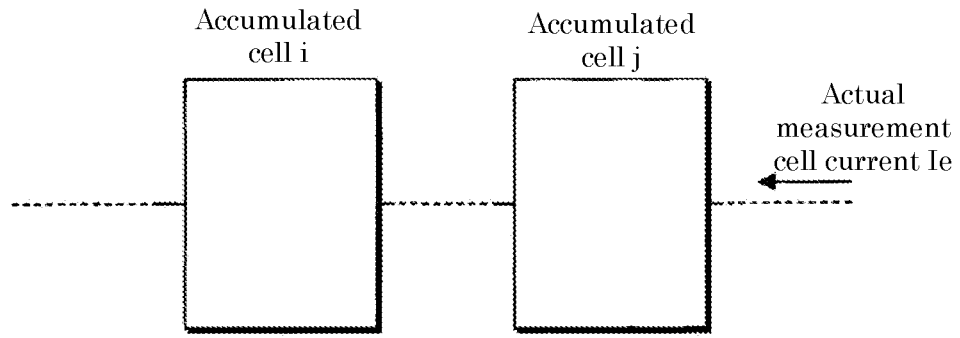

| Actual measurement cell voltage Vei | Actual measurement cell voltage Vej | Actual measurement inter-cell voltage difference ΔV |
|---|---|---|
| Calculated cell voltage Vci | Calculated cell voltage Vcj | |
| Voltage difference between actual measurement and calculation ΔVeci | Voltage difference between actual measurement and calculation ΔVecj | |

| Actual measurement cell temperature Tei | Actual measurement cell temperature Tej | Actual measurement inter-cell temperature difference ΔT |
|---|---|---|
| Calculated cell temperature Tci | Calculated cell temperature Tcj | |
| Temperature difference between actual measurement and calculation ΔTeci | Temperature difference between actual measurement and calculation ΔTecj | |

Fig. 19

| No. | Actual measurement cell current Ie | Actual measurement inter-cell voltage ΔV | Actual measurement inter-cell temperature difference ΔT | Voltage difference between actual measurement and calculation ΔVec | Temperature difference between actual measurement and calculation ΔTec | Abnormal factor | Support information about design or operation |
|---|---|---|---|---|---|---|---|
| 1 | Less than threshold | Less than threshold | Greater than or equal to threshold | Greater than or equal to threshold | Less than threshold | Environmental abnormality | Adjustment of air-conditioning |
| 2 | Greater than or equal to threshold | Greater than or equal to threshold | Less than threshold | Less than threshold | Greater than or equal to threshold | Abnormality of energy storage device | Reduction of load or replacement of energy storage device |

EVALUATION DEVICE, COMPUTER PROGRAM, AND EVALUATION METHOD

CROSS REFERENCE TO RELATED APPLICATIONS

This application is a national stage application, filed under 35 U.S.C. § 371, of International Application No. PCT/JP2020/042687, filed Nov. 17, 2020, which claims priority to Japanese Application No. 2019-208083, filed Nov. 18, 2019, the contents of both of which as are hereby incorporated by reference in their entirety.

BACKGROUND

Technical Field

The present invention relates to an evaluation device, a computer program, and an evaluation method.

Description of Related Art

In recent years, model-based development (MBD) has been actively introduced and product development based on simulation has permeated among various industries such as the automobile industry (Patent Document JP-A-11-14507). A mathematical model simulating as system outputs predetermined numerical data with respect to input of predetermined numerical data. A control program of the system is produced or a peripheral system is designed based on the mathematical model.

BRIEF SUMMARY

When the system has a high modeling difficulty level such as a secondary battery, sometimes the output of the mathematical model deviates from the output of an actual system (also referred to as an actual system). In that case, there is room for improving the mathematical model itself, and there is room for improving the configuration of the secondary battery system or the peripheral system designed based on the mathematical model, or the operation of the control program. However, such improvement has not been sufficiently studied heretofore.

An object of the present invention is to provide an evaluation device, a computer program, and an evaluation method for evaluating a system constructed based on a mathematical model.

An evaluation device of a system that uses an energy storage device includes: a mathematical model acquisition unit that acquires a mathematical model expressing a state of an energy storage device; an operation data acquisition unit that acquires operation data including time-series input data input during operation of a system, which is constructed based on the mathematical model, and time-series output data output by the system based on the time-series input data; a processing unit that executes processing of inputting the time-series input data to the mathematical model and outputting time-series model output data from the mathematical model; and an evaluation unit that evaluates design or operation of the system based on the time-series output data and the time-series model output data.

A computer program causes a computer to execute: acquiring a mathematical model expressing a state of an energy storage device; acquiring operation data including time-series input data input during operation of a system, which is constructed based on the mathematical model, and time-series output data output by the system based on the time-series input data; inputting the time-series input data to the mathematical model and outputting time-series model output data from the mathematical model; and evaluating design or operation of the system based on the time-series output data and the time-series model output data.

An evaluation method for evaluating a system that uses energy storage device includes: acquiring a mathematical model expressing a state of an energy storage device from a business operator of a system that uses the energy storage device; acquiring, from the business operator, operation data including time-series input data input during operation of the system, which is constructed based on the mathematical model, and time-series output data output by the system based on the time-series input data; executing processing of incorporating the mathematical model in a computer, inputting the time-series input data to the mathematical model, and outputting time-series model output data from the mathematical model; and evaluating design or operation of the system based on the time-series output data and the time-series model output data.

The mathematical model acquisition unit acquires the mathematical model expressing the state of the energy storage device. The state of the energy storage device includes not only the state of the energy storage device itself but also the state of the surrounding environment such as the arrangement of the energy storage device. The mathematical model represents a model in which an energy storage device or a peripheral characteristic of the energy storage device is mathematically described using an algebraic equation, a differential equation, and a characteristic parameter, and is a model obtained by executing simulation. For example, the mathematical model is an execution code executed by a programming language or numerical analysis software. The mathematical model may be definition information or a library file referred to by the programming language or the numerical analysis software.

The operation data acquisition unit acquires the operation data including time-series input data input during the operation of the system, which is constructed based on the mathematical model, and time-series output data output by the system based on the time-series input data. The operation data may include data actually obtained not only during the operation of the literally energy storage system (also referred to as a system), but also at a trial run before the operation of the energy storage system, a final stage of design, or the like.

For example, the time-series input data is power data input to the energy storage device, and can be positive power data during charge of the energy storage device and negative power data during discharge of the energy storage device. The power data means load data on the energy storage device. The time-series output data includes current data, voltage data, and temperature data of the energy storage device, and data that can be calculated from these data, for example, state of charge (SOC) data.

For example, the mathematical model and the operation data can be acquired from the business operators that conduct business such as design, introduction, operation, and maintenance of the energy storage system. For example, the operation data can be data collected within an operation period from the start of operation to the present time (for example, several months or several years after the start of operation) from such a business operator. A measurement frequency of the time-series data can be changed according to the operation state of the energy storage system or the like, and in general, the measurement frequency of the time-series data is high (for example, the measurement is performed for 5 minutes every hour) in the operation state in which a load fluctuation is relatively large, and the measurement frequency of the time-series data is low (for example, the measurement is performed for 5 minutes every six hours) in the operation state in which a load fluctuation is relatively small.

The processing unit executes processing of inputting the time-series input data to the mathematical model and outputting the time-series model output data from the mathematical model. For example, the time-series input data input to the mathematical model is the same data as the power data included in the operation data (means that the same load is input). When the operation period is relatively long like 1 year, for example, the operation period may be divided into units of one week, one month, or the like, and the power data for each divided period may be input to the mathematical model. The mathematical model outputs current data, voltage data, and temperature data of the energy storage device. Further, the SOC (charge state) data can be calculated from these data.

The evaluation unit evaluates the design or operation of the energy storage system based on the time-series output data and the time-series model output data. That is, the evaluation unit compares the voltage data, the current data, and the temperature data of the energy storage device included in the operation data of the energy storage system to the voltage data, the current data, and the temperature data output from the mathematical model when the same power data as the power data actually input to the energy storage system is input to the mathematical model. Data comparison is performed by synchronizing date and time. That is, data of the same date and time is compared. For example, the evaluation unit can evaluate the design or operation of the energy storage system based on whether deviation exists between at least one of the voltage data, the current data, and the temperature data of the two. It can be determined that a possibility of an abnormal event exists when a degree of deviation is greater than an assumed range, and it can be determined that the abnormal event exists when the degree of deviation is further larger.

According to the above-described configuration, the design or operation of the system that is constructed based on the mathematical model and uses the energy storage device can be evaluated.

The evaluation device may further include: a comparison value calculation unit that calculates comparison value time-series data indicating a comparison value between the time-series output data and the time-series model output data; and a determination unit that determines existence of an abnormal event of the system based on the comparison value time-series data calculated by the comparison value calculation unit. The evaluation unit may evaluate the design or operation of the system when the determination unit determines that the abnormal event exists.

The comparison value calculation unit calculates comparison value time-series data indicating a comparison value between the time-series output data and the time-series model output data. For example, the difference between the actual voltage data of the energy storage device and the voltage data output from the mathematical model is calculated. The comparison value is a comparison value of data of the same date, time, minute, and second. When the actual voltage data of the energy storage device and the voltage data output from the mathematical model are not the same time point, output timing of the mathematical model may be adjusted such that the timing of the voltage data output from the mathematical model is matched with the timing of the actual voltage data. The same applies to the current data and the temperature data.

The determination unit determines the existence of the abnormal event in the energy storage system based on the comparison value time-series data calculated by the comparison value calculation unit. It can be determined that a possibility of an abnormal event exists when the comparison value is greater than the threshold, and it can be determined that the abnormal event exists when the comparison value is further greater than the threshold.

When the determination unit determines that the abnormal event exists, the evaluation unit evaluates the design or operation of the energy storage system. When the determination unit determines that the abnormal event does not exist, the energy storage system may not be evaluated. According to the above-described configuration, the design or operation of the system that is constructed based on the mathematical model and uses the energy storage device can be evaluated.

In the evaluation device, the time-series output data may include actual measurement values of an electric value and a temperature value of an energy storage device used in the system, the time-series model output data may include calculated values of an electric value and a temperature value of the mathematical model expressing the energy storage device, and the determination unit may determine the existence of the abnormal event of the system based on the actual measurement value and the calculated value.

The time-series output data includes the actual measurement values of an electric value and a temperature value of the energy storage device used in the energy storage system constructed based on the mathematical model, and the time-series model output data includes calculated values of the electric value and the temperature value output by the mathematical model expressing the energy storage device.

The determination unit determines the existence of the abnormal event in the energy storage system based on the actual measurement value and the calculated value. Whether the load is a heavy loading or a light loading, or magnitude of the load fluctuation can be determined by the actual measurement current value flowing through the energy storage device. The required voltage difference between the energy storage devices can be obtained based on the actual measurement value of the voltage of each energy storage device. A required temperature difference between the energy storage devices can be obtained based on the actual measurement value of the temperature of each energy storage device. The determination unit can determine the existence of the abnormal event (for example, the abnormality of the energy storage device (degradation earlier than assumed and the like) or the abnormality of the environment of the energy storage device) by considering the actual measurement values of the voltage difference and the temperature difference, the difference between the actual measurement value and the calculated value, and the like.

In the evaluation device, the comparison value calculation unit may include: a first calculation unit that calculates an actual measurement voltage difference and an actual measurement temperature difference between required energy storage devices based on the actual measurement values; and a second calculation unit that calculates a difference between the actual measurement value and the calculated value for voltage and temperature of one of the required energy storage devices based on the actual measurement value and the calculated value, and the determination unit may determine a factor of the abnormal event based on an actual measurement current value, the actual measurement voltage difference and the actual measurement temperature difference that are calculated by the first calculation unit, and the difference between the actual measurement value and the calculated value that are calculated by the second calculation unit.

The comparison value calculation unit includes the first calculation unit and the second calculation unit. The first calculation unit calculates an actual measurement voltage difference and an actual measurement temperature difference between the required energy storage devices based on the actual measurement values.

The second calculation unit calculates a difference between the actual measurement value and the calculated value for the voltage and the temperature of one of the required energy storage devices based on the actual measurement value and the calculated value.

The determination unit determines the factor of the abnormal event based on the actual measurement current value, the actual measurement voltage difference and the actual measurement temperature difference calculated by the first calculation unit, and the difference between the actual measurement value and the calculated value calculated by the second calculation unit. For example, the abnormality of the one energy storage device can be determined when the actual measurement current value and the actual measurement voltage difference between the energy storage devices are large and the difference between the actual measurement value and the calculated value is also large. On the other hand, the abnormality of the environment can be determined when the actual measurement current value is small, the actual measurement temperature difference between the energy storage devices are large, and the difference between the actual measurement value and the calculated value is also large.

In the evaluation device, the determination unit may determine whether the abnormal event is an abnormality of the energy storage device used in the system or an abnormality of an environment of the energy storage device.

The evaluation method may further include: calculating comparison value time-series data indicating a comparison value between the time-series output data and the time-series model output data; and determining an abnormal event indicating whether an abnormality is generated in an energy storage device used in the system or an abnormality is generated in an environment of the energy storage device based on the calculated comparison value time-series data.

The determination unit can determine whether the abnormal event is the abnormality of the energy storage device used in the energy storage system or the abnormality of the environment of the energy storage device. For example, the abnormality of the energy storage device includes the case where it is determined that the energy storage device has degraded earlier than expected. The abnormality of the energy storage device and the abnormality of the environment can be discriminately determined, so that the erroneous determination that the energy storage device is abnormal can be prevented.

The evaluation device may further include a degradation state estimation unit that estimates a degradation state of the energy storage device at a required time point based on the operation data. The determination unit may determine the factor of the abnormal event of the system when the degradation state estimated by the degradation state estimation unit is less than or equal to a target value.

The degradation state estimation unit estimates a degradation state of the energy storage device at the required time point based on the operation data. For example, the degradation state estimation unit may include a degradation simulator, or include a learned model learned by machine learning. The operation data can be time-series data of the SOC calculated based on the current data or the voltage data of the energy storage device and time-series data of the temperature of the energy storage device. The degradation state estimation unit can estimate a degradation value of the energy storage device based on the time-series data of the SOC and the time-series data of the temperature. That is, the degradation state estimation unit can estimate the decrease (degradation value) of the SOH from the time point t1 to the time point tn based on the time-series data of the SOC and the temperature from the time point t1 to the time point tn. The time point tn can be a time point at which a required time elapses from the time point t1 toward the future. The time difference between the time point t1 and the time point tn is a degradation prediction target period, and for example, can be the required time such as one month, half a year, one year, or two years.

When the degradation state (for example, the SOH) estimated by the degradation state estimation unit is less than or equal to a target value, the determination unit determines the factor of the abnormal event of the energy storage system. For example, the target value is the SOH at a time point (expected life) when the assumed years have elapsed from the start of the operation, and can be set to an end of life (EOL) of the energy storage device. In the expected life, the SOH of the energy storage device should deviate from the SOH obtained from the calculated value of the mathematical model when the SOH of the energy storage device is less than or equal to the EOL, and a measure to bring the energy storage system in the actual operation closer to the energy storage system constructed by the mathematical model needs to be taken when the SOH estimated based on the operation data is less than or equal to the EOL. Accordingly, in such a case, the determination unit can determine the factor of the abnormal event of the energy storage system in the actual operation. In addition, when the SOH of the energy storage device exceeds the EOL in the expected life, it is considered that the actually-operated energy storage system is within the assumed range of the energy storage system constructed based on the mathematical model, and thus, the factor of the abnormal event of the energy storage system needs not to be determined.

The evaluation device may further include a provision unit that provides support information about the design or operation of the system based on a determination result of the determination unit.

In the evaluation method, support information about the design or operation of the system may be provided based on a determination result of the abnormal event.

The provision unit provides the support information about the design or operation of the system based on the determination result by the determination unit. For example, when it is determined that there is the abnormality of the energy storage device, the support information such as replacement or expansion of the energy storage device and reduction of the load can be provided. When the abnormal event is determined to be the abnormality of the environment, the support information such as adjustment of air conditioning (for example, lowering the temperature) and the change in the arrangement of the energy storage devices can be provided, and the support information supporting optimal operation of the energy storage system according to the abnormality factor can be provided.

The system design parameters or the mathematical model itself can be reviewed when the energy storage system is constructed using the mathematical model. The system design parameter of the energy storage device includes the type, number, rating, and the like of the energy storage device used in the entire system, and for example, includes various parameters required for system design such as the configuration or number of energy storage modules, and the configuration or number of banks. That is, in the initial design, it is estimated that the SOH of the energy storage device does not become equal to or less than the EOL when the expected life reaches, but in the degradation state based on the actual operation data, the SOH of the energy storage device becomes equal to or less than the EOL when the expected life reaches. In such a case, the support information regarding the review of the design parameter or the mathematical model itself can be provided.

According to the above-described configuration, the design or operation of the system that is constructed based on the mathematical model and uses the energy storage device can be evaluated.

BRIEF DESCRIPTION OF THE FIGURES

FIG. 11 is a schematic diagram illustrating operation of the degradation simulator 61a.

FIG. 16 is an explanatory diagram illustrating an example of a relationship between the actual measurement value and a predicted value.

FIG. 19 is an explanatory diagram illustrating an example of a rule base model for abnormality factor determination.

DETAILED DESCRIPTION OF VARIOUS EMBODIMENTS

Figure 1:
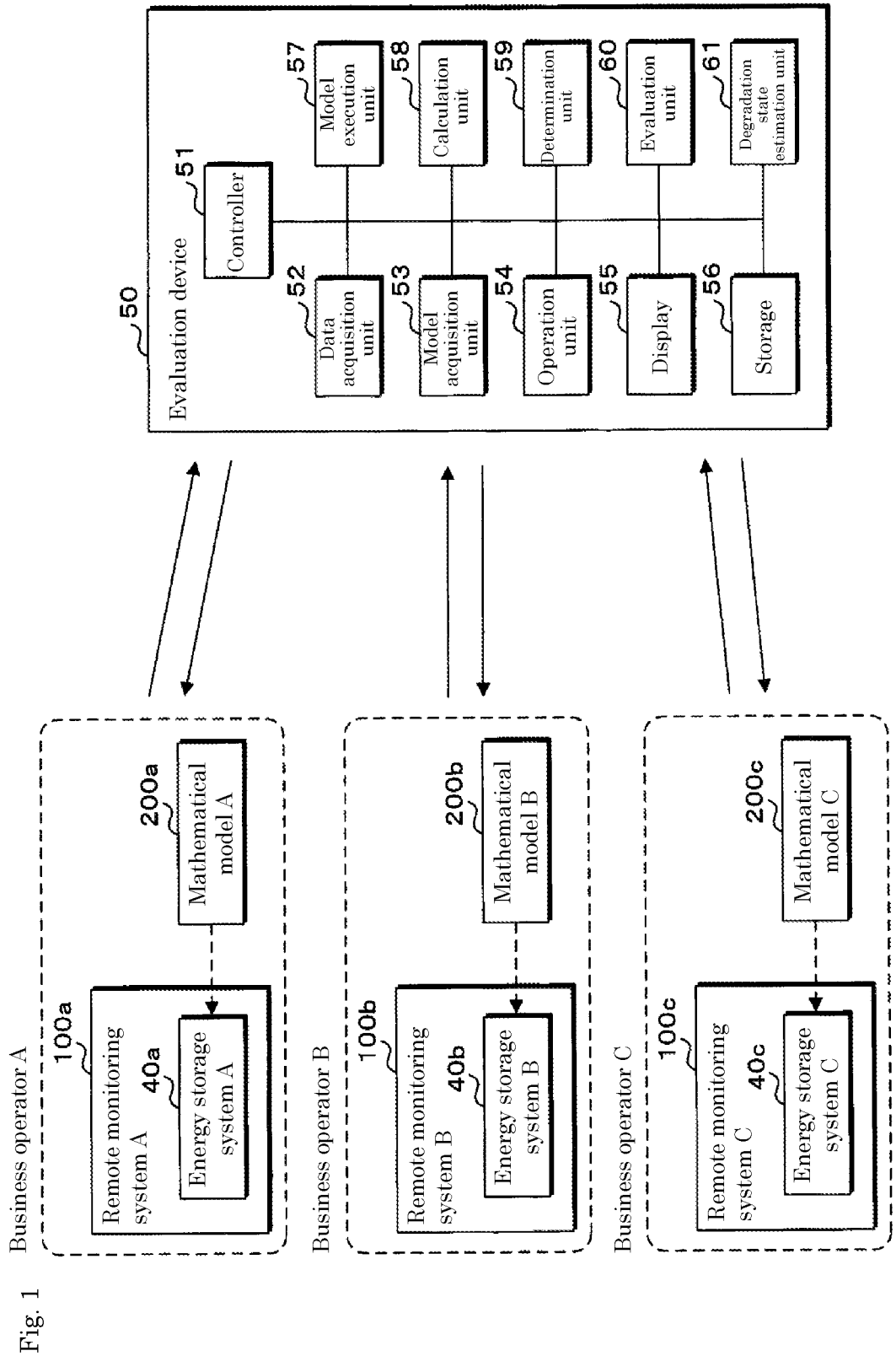
FIG. 1 is a diagram illustrating a configuration of an evaluation device of an embodiment.

Hereinafter, an evaluation device according to an embodiment will be described with reference to the drawings. FIG. 1 is a diagram illustrating a configuration of an evaluation device 50 of the embodiment. The evaluation device 50 includes a controller 51 that controls the entire device, a data acquisition unit 52, a model acquisition unit 53, an operation unit 54, a display 55, a storage 56, a model execution unit 57, a calculation unit 58, a determination unit 59, an evaluation unit 60, and a degradation state estimation unit 61.

A business operator A can conduct an enterprise such as design, introduction, operation, and maintenance of an energy storage system 40a, and remotely monitor the energy storage system 40a using, for example, a remote monitoring system 100a. The energy storage system 40a is constructed using a mathematical model 200a. That is, the business operator A holds the mathematical model 200a and holds operation data of the energy storage system 40a obtained by remote monitoring. Similarly, a business operator B holds a mathematical model 200b and holds the operation data of an energy storage system 40b obtained by the remote monitoring. Similarly, a business operator C holds a mathematical model 200c and holds the operation data of an energy storage system 40c obtained by the remote monitoring. For example, the energy storage systems 40a, 40b, 40c are used in a thermal power generation system, a mega solar power generation system, a wind power generation system, an uninterruptible power supply (UPS), and a railway stabilized power supply system.

The mathematical models 200a, 200b, 200c represent a model in which an energy storage device or a peripheral characteristic of the energy storage device is mathematically described using an algebraic equation, a differential equation, and a characteristic parameter, and is a model obtained by executing simulation. For example, the mathematical model is an execution code executed by a programming language or numerical analysis software. The mathematical model may be definition information or a library file referred to by the programming language or the numerical analysis software. The mathematical models 200a, 200b, 200c are different from one another.

The operation data may include data actually obtained not only during the operation of the energy storage system (also referred to as a system) but also at a trial run before the operation of the energy storage system, a final stage of design, or the like. The operation data includes time-series input data and time-series output data. For example, the time-series input data is power data input to the energy storage device, and can be positive power data during charge of the energy storage device and negative power data during discharge of the energy storage device. The power data means load data on the energy storage device. The time-series output data includes current data, voltage data, and temperature data of the energy storage device, and data that can be calculated from these data, for example, state of charge (SOC) data.

For example, when acquiring the mathematical model 200a and the operation data of the energy storage system 40a from the business operator A, the evaluation device 50 can perform necessary processing using the acquired mathematical model and operation data, evaluate the design or operation of the energy storage system 40a of the business operator A based on the processing result, and provide support information about the design or operation of the energy storage system 40a to the business operator A based on the evaluation result. Similarly, for the business operator B, when acquiring the mathematical model 200b and the operation data of the energy storage system 40b, the evaluation device 50 can provide support information regarding the design or operation of the energy storage system 40b to the business operator B. The same applies to the business operator C. The mathematical models 200a, 200b, 200c are also referred to as a mathematical model 200.

Figure 2:
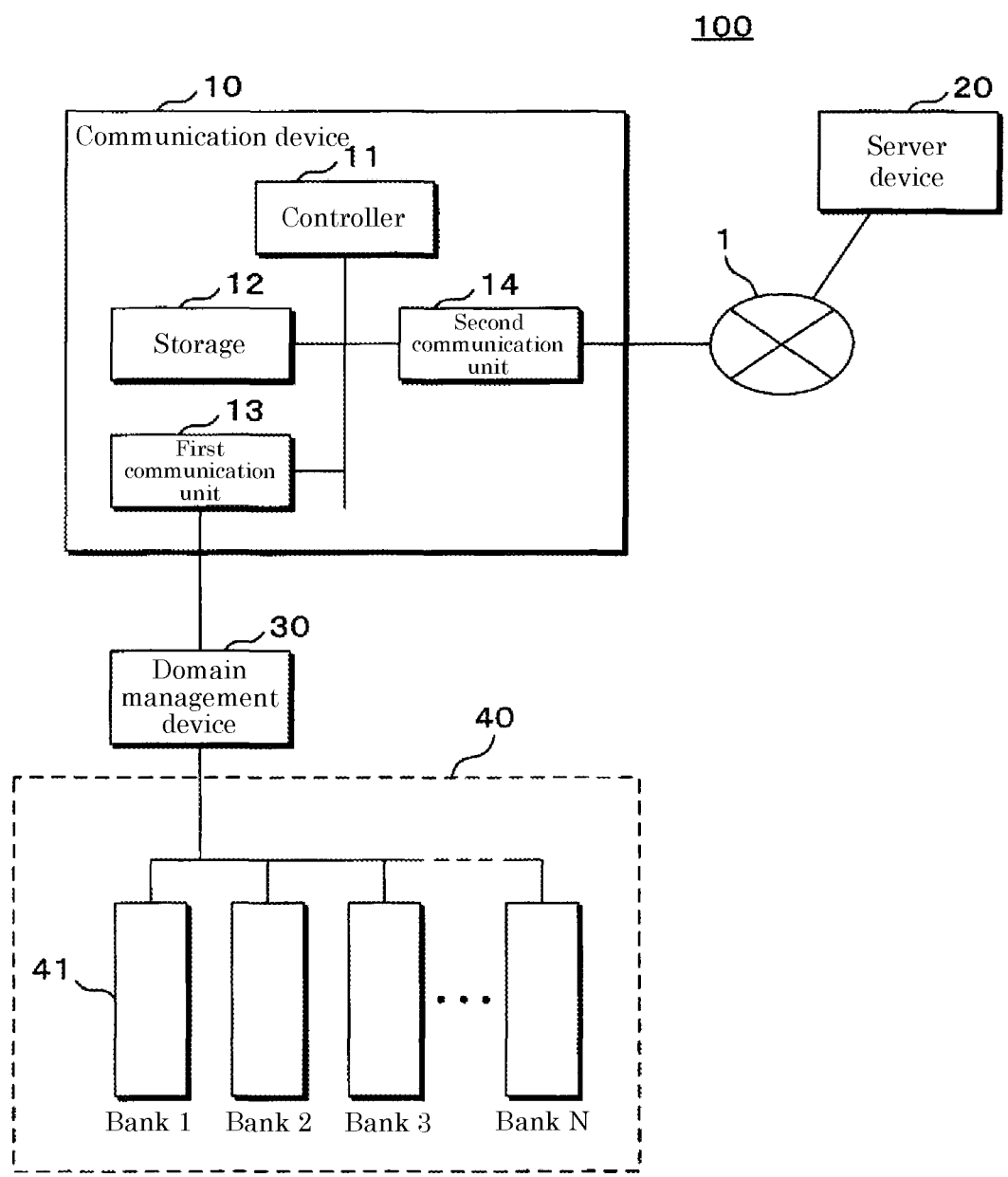
FIG. 2 is a diagram illustrating an example of a configuration of a remote monitoring system.
Figure 3:
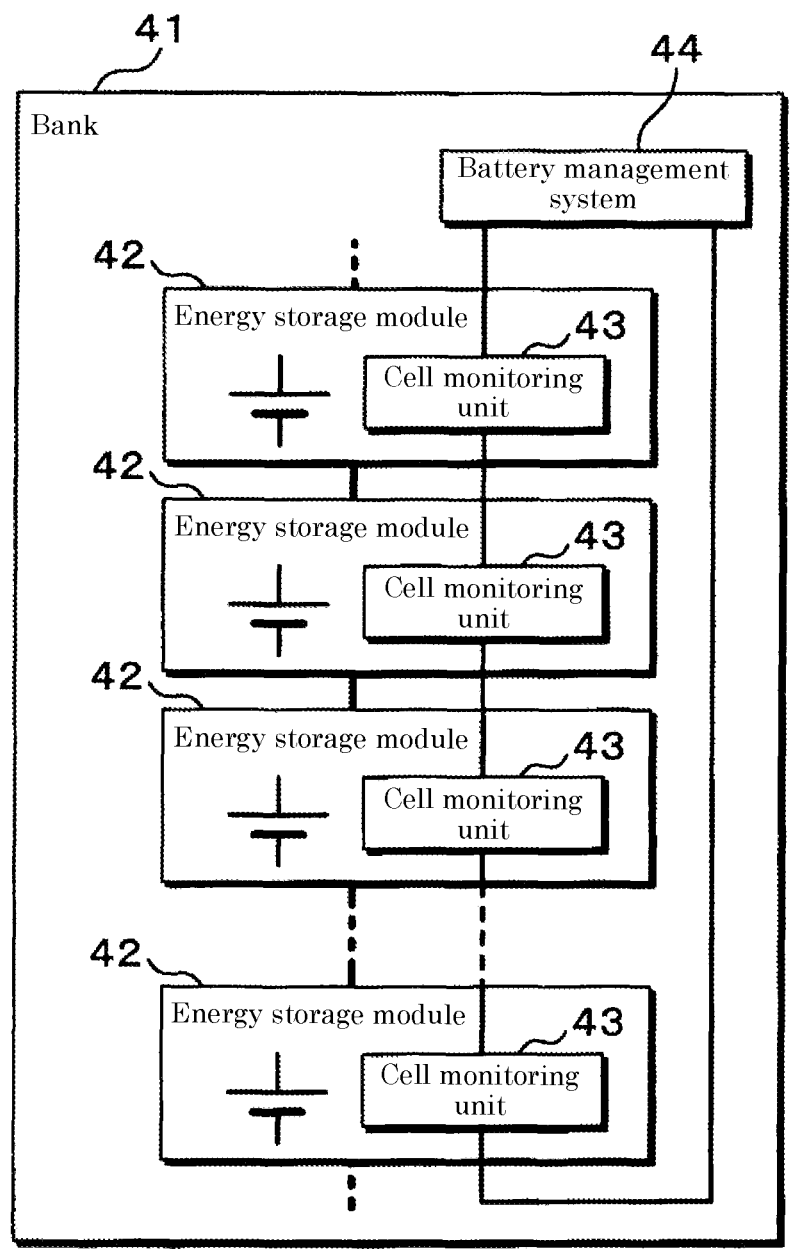
FIG. 3 is a diagram illustrating an example of a configuration of a bank.

FIG. 2 is a diagram illustrating an example of a configuration of the remote monitoring system 100, and FIG. 3 is a diagram illustrating an example of a configuration of a bank 44. As illustrated in FIG. 2, the remote monitoring system 100 includes a communication device 10, a server device 20 connected to the communication device 10 through a communication network 1, a domain management device 30, and an energy storage system 40. The energy storage system 40 includes a plurality of banks 41. As illustrated in FIG. 3, the bank 41 is formed by connecting a plurality of energy storage modules in series, and includes a battery management system (BMS) 44, a plurality of energy storage modules 42, and a cell monitoring unit) (CMU) 43 provided in each energy storage module 42.

The communication device 10 includes a controller 11, a storage 12, a first communication unit 13, and a second communication unit 14. The controller 11 includes a central processing unit (CPU), and controls the entire communication device 10 using a built-in memory such as a read only memory (ROM) and a random access memory (RAM).

For example, a nonvolatile memory such as a flash memory can be used as the storage 12. The storage 12 can store necessary information, and for example, can store information obtained by processing of the controller 11.

The first communication unit 13 can communicate with the domain management device 30.

The second communication unit 14 can communicate with the server device 20 through the communication network 1.

The domain management device 30 transmits and receives information to and from a battery management system 44 in each bank 41 using a predetermined communication interface.

Each of banks 1 to N includes a plurality of energy storage modules 42, and each of the energy storage modules 42 includes a cell monitoring unit 43. In each energy storage module 42, a plurality of energy storage cells (energy storage devices) are connected in series. The cell monitoring unit 43 can acquire energy storage device information about a state of each energy storage cell of the energy storage module 42, and for example, the energy storage device information includes voltage, current, temperature, the SOC (charge state), and a state of health (SOH) of the energy storage cell. For example, the energy storage device information can be repeatedly acquired at an appropriate cycle of 0.1 seconds, 0.5 seconds, or 1 second. The data in which the energy storage device information is accumulated becomes a part of the operation data. The energy storage cell is preferably a secondary battery such as a lead-acid battery and a lithium ion battery or a rechargeable capacitor. A part of the energy storage cell may be a non-rechargeable primary battery.

The battery management system 44 can communicate with the cell monitoring unit 43 having a communication function by serial communication, and acquire the energy storage device information detected by the measurement circuit board 43. The battery management system 44 can transmit and receive information to and from the domain management device 30. The domain management device 30 aggregates the energy storage device information from the battery management system 44 of the bank belonging to the domain. The domain management device 30 outputs the aggregated energy storage device information to the communication device 10. In this manner, the communication device 10 can acquire the operation data of the energy storage system 40 through the domain management device 30.

The storage 12 can store the operation data acquired through the domain management device 30.

The server device 20 can collect the operation data of the energy storage system 40 from the communication device 10. The server device 20 can divide and store the collected operation data (time-series actual measurement voltage data, time-series actual measurement current data, time-series actual measurement temperature data, time-series power data, and time-series SOC data) for each energy storage device.

Subsequently the evaluation device 50 will be described.

For example, the data acquisition unit 52 can include a recording medium reading device and communication circuit, and has a function as an operation data acquisition unit. The data acquisition unit 52 acquires the operation data including time-series input data input during the operation of the energy storage system 40 constructed based on the mathematical model 200 and time-series output data output by the system based on the time-series input data.

For example, the model acquisition unit 53 can include a recording medium reading device and a communication circuit, and has a function as a mathematical model acquisition unit. The model acquisition unit 53 acquires the mathematical model 200 expressing the state of the energy storage device. The state of the energy storage device includes not only the state of the energy storage device itself but also the state of the surrounding environment such as the arrangement of the energy storage device.

For example, the mathematical model and the operation data can be acquired from the business operators A, B, C that conduct business such as design, introduction, operation, and maintenance of the energy storage system. For example, the operation data can be data collected within an operation period from the start of operation to the present time (for example, several months or several years after the start of operation) from such a business operator. A measurement frequency of the time-series data can be changed according to the operation state of the energy storage system or the like, and in general, the measurement frequency of the time-series data is high (for example, the measurement is performed for 5 minutes every hour) in the operation state in which a load fluctuation is relatively large, and the measurement frequency of the time-series data is low (for example, the measurement is performed for 5 minutes every six hours) in the operation state in which a load fluctuation is relatively small.

The storage 56 can store the operation data acquired by the data acquisition unit 52 and the mathematical model 200 acquired by the model acquisition unit 53.

For example, the operation unit 54 can include an input device such as a keyboard, a mouse, or a touch panel.

The display 55 can be configured by a liquid crystal panel, an organic electro luminescence (EL) display, or the like.

The model execution unit 57 can include a CPU, a ROM, and a RAM, or may include a graphics processing unit (GPU). The model execution unit 57 can provide an execution environment (simulation environment) of the mathematical model 200 by incorporating the mathematical model 200 acquired by the model acquisition unit 53.

The model execution unit 57 has a function as a processing unit, and executes processing of inputting the time-series input data to the mathematical model 200 and outputting the time-series model output data from the mathematical model 200. For example, the time-series input data input to the mathematical model is the same data as the power data included in the operation data (means that the same load is input).

Figure 4:
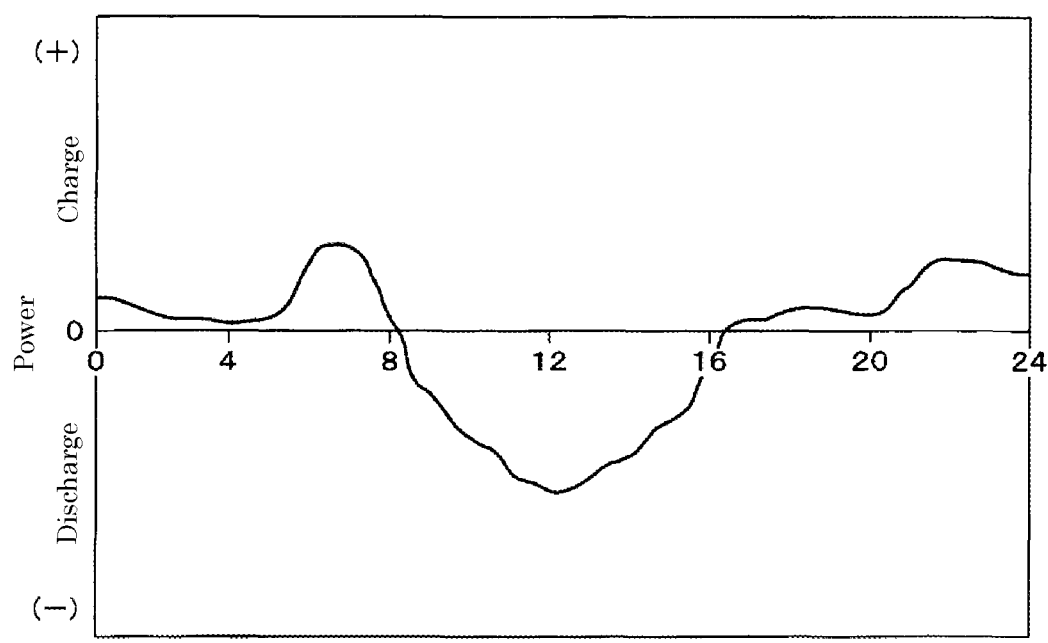
FIG. 4 is a diagram schematically illustrating power data included in operation data.

FIG. 4 is a diagram schematically illustrating power data included in the operation data. In FIG. 4, a horizontal axis indicates time, and a vertical axis indicates the amount of power for each time zone. The power data corresponds to the load data when viewed from the energy storage device, and the positive side can be charged and the negative side can be discharged. In the example of FIG. 4, the discharge is performed in the daytime, and the charge is performed in the early morning and at night. The power data illustrated in FIG. 4 is an example, and the power data may be alternatively different from the example of FIG. 4. The operation period of the power data may be one day as illustrated in FIG. 4, or may be an appropriate period such as one week, two weeks, one month, three months, half a year, or one year.

For example, when the operation period is relatively long like 1 year, the operation period may be divided into units of one week, one month, or the like, and the power data for each divided period may be input to the mathematical model 200. The mathematical model 200 outputs current data, voltage data, and temperature data of the energy storage device. Further, the SOC (charge state) data can be calculated from these data.

The evaluation unit 60 can evaluate the design or operation of the energy storage system based on the time-series output data included in the operation data and the time-series model output data output by the mathematical model 200. The evaluation unit 60 compares the voltage data, the current data, and the temperature data (these are collectively referred to as time-series output data) of the energy storage device included in the operation data of the energy storage system to the voltage data, the current data, and the temperature data (these are collectively referred to as time-series model output data) output from the mathematical model 200 when the same power data as the power data actually input to the energy storage system and the ambient temperature (for example, the temperature of the energy storage device, the temperature of the energy storage module, and the temperature in the storage battery board) of the energy storage device are input to the mathematical model 200. When the comparison is performed from the middle of the operation period, desirably the state of the energy storage device such as a capacity retention ratio, an internal resistance, and the SOC of the energy storage device at the time point of starting the comparison is input as an initial value of the mathematical model 200 based on the actual measurement value.

The time-series output data included in the operation data includes actual measurement values of an electric value and a temperature value of the energy storage device. For example, the time-series output data includes the actual measurement values of the current data, the voltage data, and the temperature data of the energy storage device. The time-series model output data includes calculated values of the electric value and the temperature value output by the mathematical model 200. For example, the time-series output data includes the calculated values of the current data, the voltage data, and the temperature data of the energy storage device.

Figure 5:
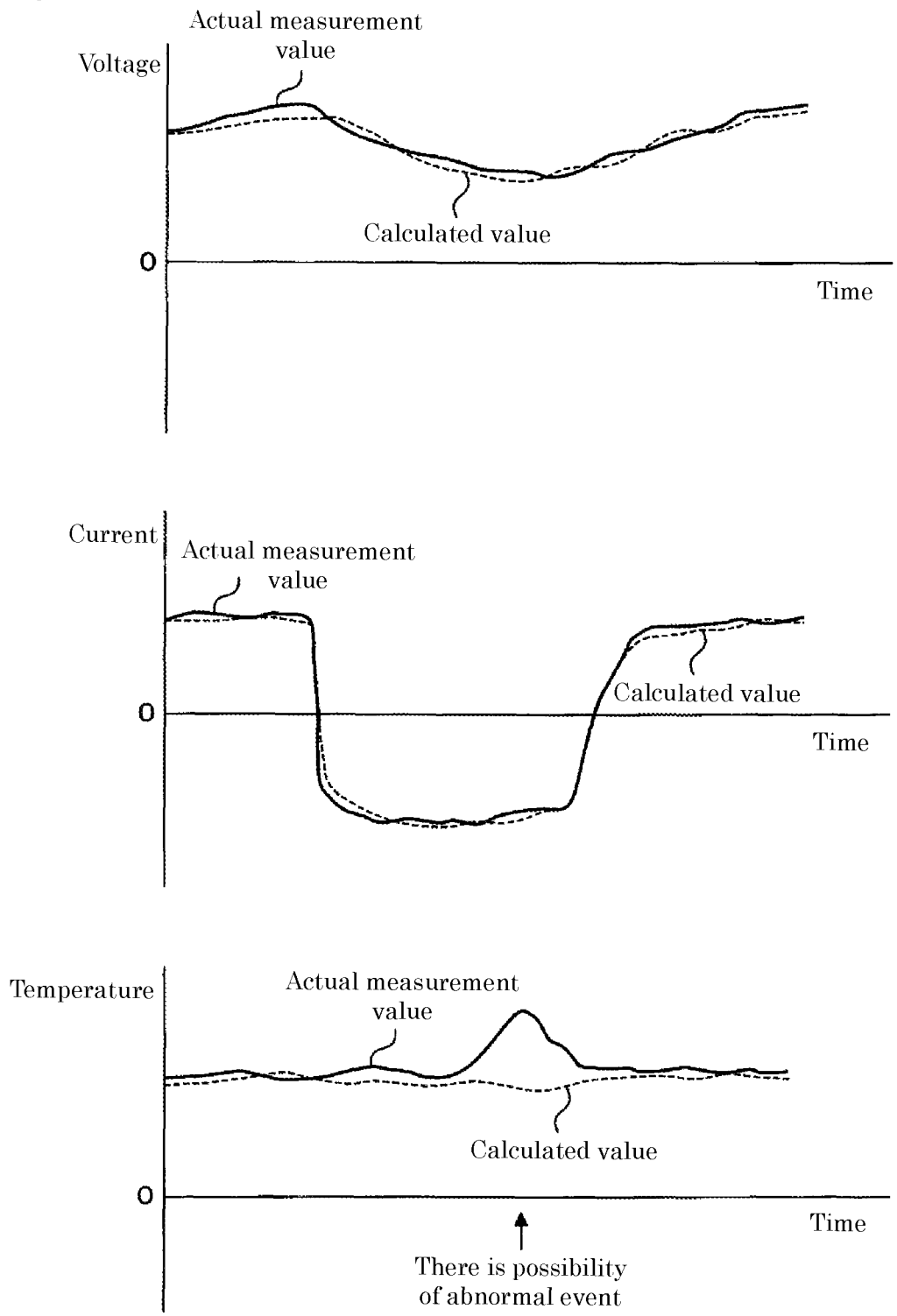
FIG. 5 is a diagram illustrating an example of an actual measurement value included in the operation data and a calculated value output by a mathematical model.

FIG. 5 is a diagram illustrating an example of the actual measurement value included in the operation data and the calculated value output by the mathematical model 200. In the actual measurement values and the calculated values, the respective values of the voltage, the current, and the temperature of the energy storage device are contrasted while the time is synchronized. The evaluation unit 60 can evaluate the design or operation of the energy storage system based on whether a deviation exists between the actual measurement voltage value and the calculated voltage value, between the actual measurement current value and the calculated current value, and between the actual measurement temperature value and the calculated temperature value. It can be determined that a possibility of an abnormal event exists when a degree of deviation is greater than an assumed range, and it can be determined that the abnormal event exists when the degree of deviation is further larger. In the example of FIG. 5, the problematic deviation does not exist between the actual measurement values and the calculated values for the voltage and the current. However, it is determined that the possibility of the abnormal event exists because the deviation exists between the actual measurement value and the calculated value for the temperature. Accordingly, the evaluation unit 60 can determine that an unexpected event exists. In the example of FIG. 5, the state in which the deviation exists for the temperature is illustrated, but it can be determined that the possibility of the unexpected event when the deviation exists for the voltage or current.

Specifically, the calculation unit 58 has a function as a comparison value calculation unit, and can calculate comparison value time-series data indicating a comparison value between the time-series output data and the time-series model output data. The comparison value may be any value that can be compared, and for example, may be a difference or a ratio or a proportion instead of the difference. For example, the comparison value between the actual voltage data of the energy storage device and the voltage data output from the mathematical model 200 is calculated. The comparison value is a comparison value of data of the same date, time, minute, and second. When the actual voltage data of the energy storage device and the voltage data output from the mathematical model 200 are not the same time point, output timing of the mathematical model 200 may be adjusted such that the timing of the voltage data output from the mathematical model 200 is matched with the timing of the actual voltage data. The same applies to the current data and the temperature data.

The determination unit 59 can determine the existence of the abnormal event in the energy storage system based on the comparison value time-series data calculated by the calculation unit 58. When the comparison value is greater than a threshold, it can be determined that the possibility of the abnormal event exists. When the comparison value is further greater than the threshold, it can be determined that the abnormal event exists.

According to the above-described configuration, the design or operation of the energy storage system 40 constructed based on the mathematical model 200 can be evaluated. A specific evaluation method will be described later.

When it is determined that the possibility of the abnormal event (unexpected event) exists, the evaluation device 50 needs to evaluate whether the energy storage system 40 can satisfy the requirement for the assumed number of years when the current operation state is continued using the operation data of the energy storage system 40. This point will be described below.

Figure 6:
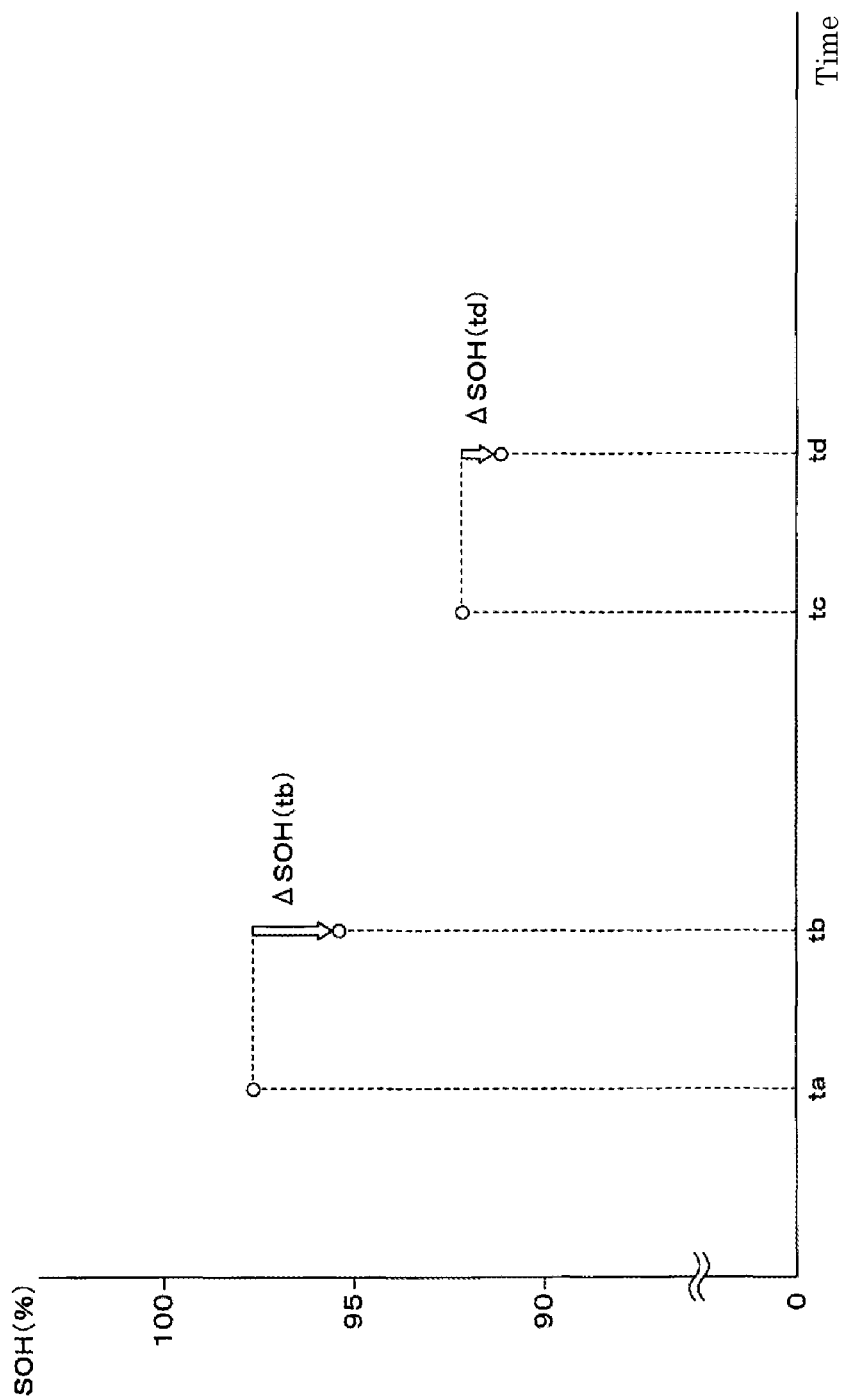
FIG. 6 is a schematic diagram illustrating an example of a decrease in a state of health (SOH) according to a use time of an energy storage device.

FIG. 6 is a schematic drawing illustrating an example of a decrease in the SOH according to a use time of the energy storage device. In FIG. 6, the vertical axis indicates the state of health (SOH), and the horizontal axis indicates time. The SOH of the energy storage device decreases depending on the use time (including a standing time). As illustrated in FIG. 6, the time points ta, tb, tc, td are set, and the time points tb and ta are set to the same as the time points td and tc. In this case, a decrease ΔSOH (tb) of the SOH between the time point ta and the time point tb is different from a decrease ΔSOH (td) of the SOH between the time point tc and the time point td. As described above, the degree of decrease in the SOH varies depending on the use state of the energy storage device even during the same use period. Accordingly, in order to specify various use states of the energy storage device, grasping the use state of the energy storage device between two different time points is a required factor for estimating the SOH of the energy storage device.

The degradation state estimation unit 61 estimates a degradation state of the energy storage device at the required time point based on the operation data (actual measurement value). For example, the degradation state estimation unit 61 may include a degradation simulator 61a, or include a learned model learned by machine learning. The actual measurement value can be time-series data of the SOC calculated based on the current data or the voltage data of the energy storage device and time-series data of the temperature of the energy storage device.

Figure 7:
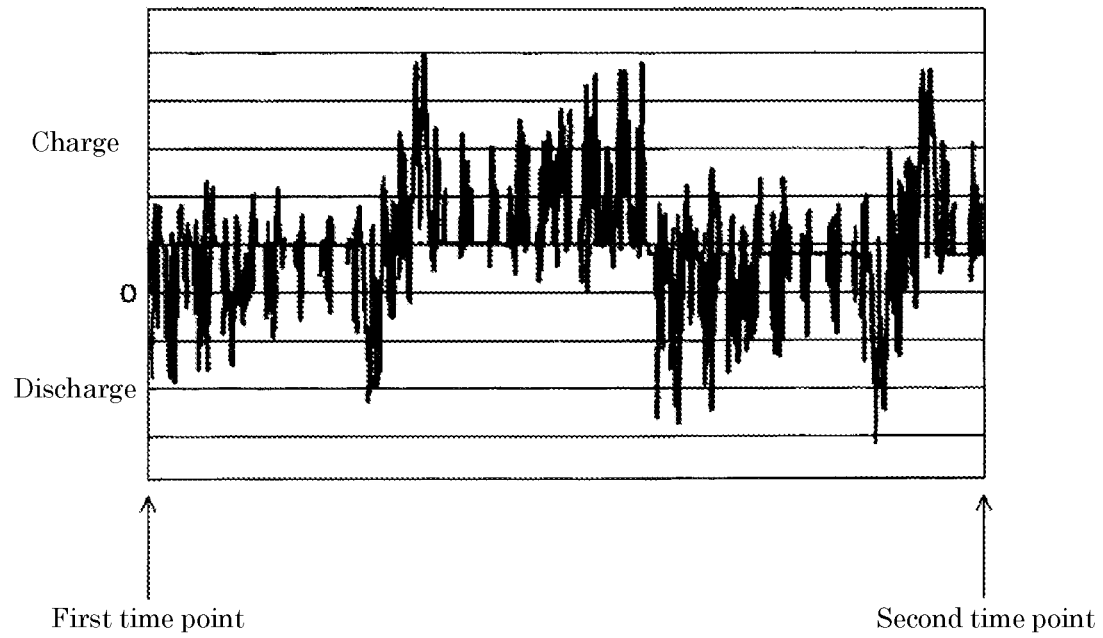
FIG. 7 is a schematic diagram illustrating an example of a current waveform from a first time point to a second time point included in the operation data.

FIG. 7 is a schematic diagram illustrating an example of a current waveform from a first time point to a second time point included in the operation data. In FIG. 7, the vertical axis indicates current, the positive side indicates charge, and the negative side indicates discharge. The horizontal axis indicates time. The current waveform in FIG. 7 is an example, and other current waveforms may alternatively be used.

Figure 8:
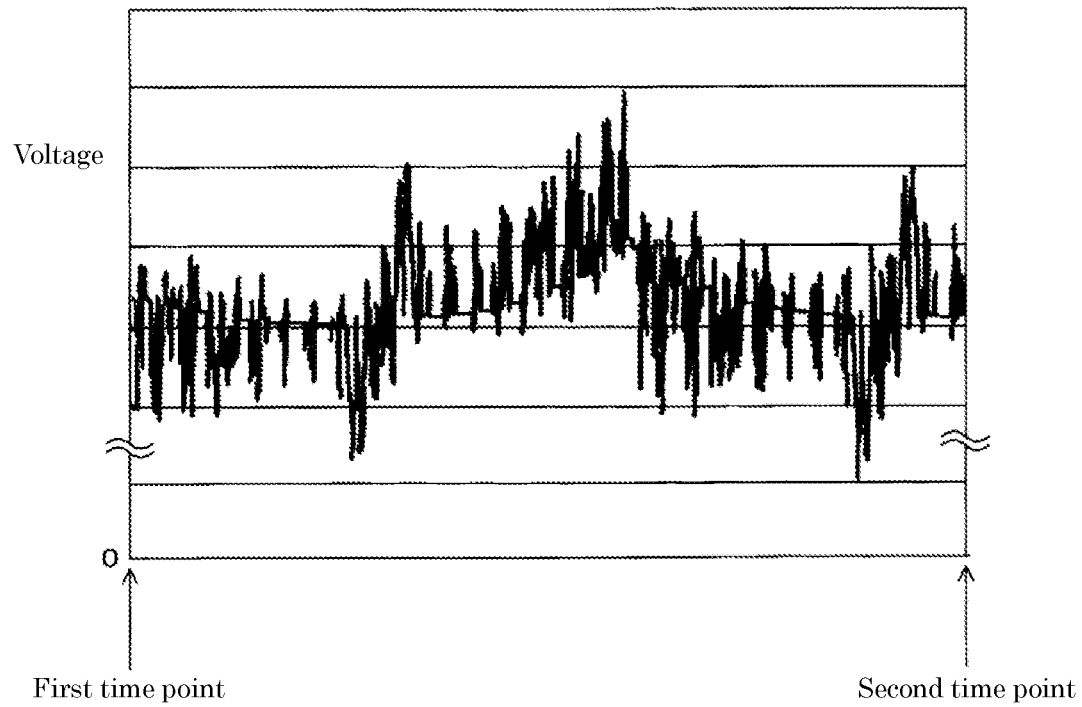
FIG. 8 is a schematic diagram illustrating an example of the voltage waveform from the first time point to the second time point included in the operation data.

FIG. 8 is a schematic diagram illustrating an example of the voltage waveform from the first time point to the second time point included in the operation data. In FIG. 8, the vertical axis indicates voltage, and the horizontal axis indicates time. The voltage waveform in FIG. 8 is an example, and other voltage waveforms may alternatively be used.

Figure 9:
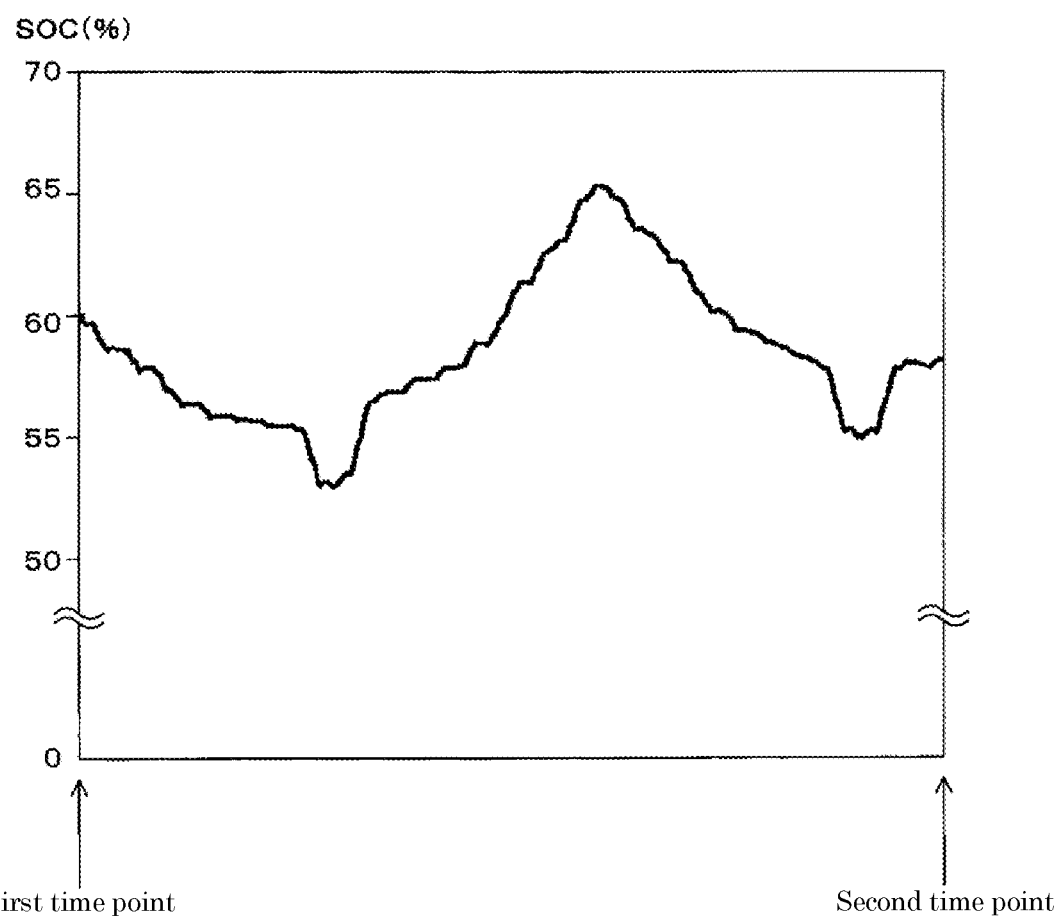
FIG. 9 is a schematic diagram illustrating an example of state of charge (SOC) data from the first time point to the second time point included in the operation data.

FIG. 9 is a schematic diagram illustrating an example of the SOC data from the first time point to the second time point included in the operation data. In FIG. 9, the vertical axis indicates the SOC, and the horizontal axis indicates the time. The SOC data can be calculated based on the time-series current data of the energy storage device as illustrated in FIG. 7. For example, the SOC data can be obtained by a current integration method.

Figure 10:
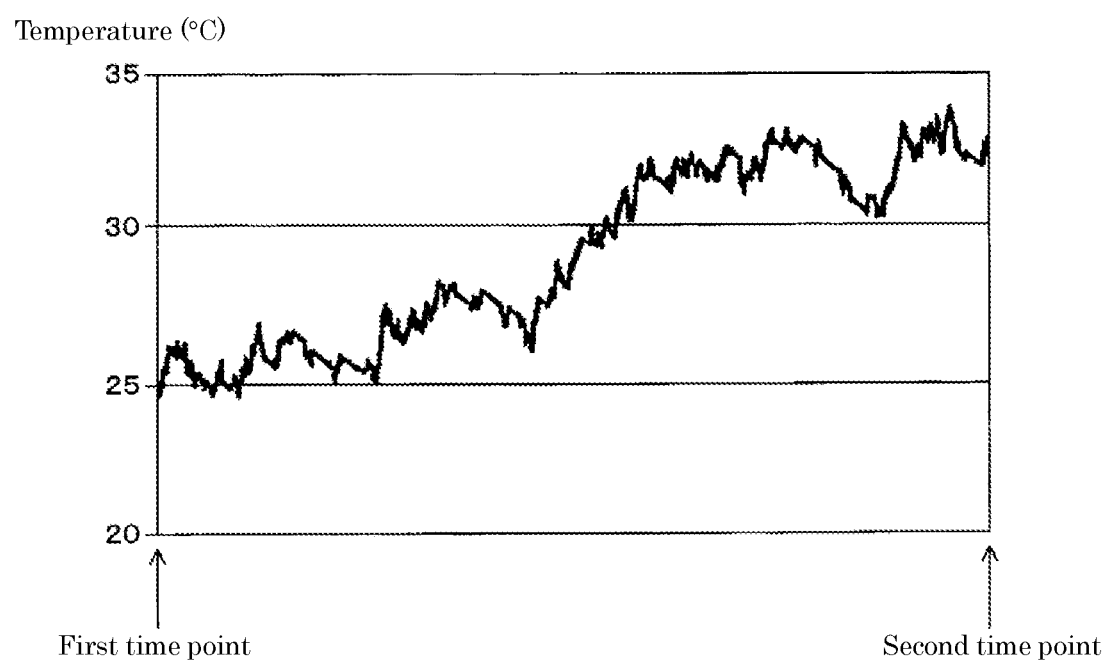
FIG. 10 is a schematic diagram illustrating an example of temperature data from the first time point to the second time point included in the operation data.

FIG. 10 is a schematic diagram illustrating an example of the temperature data from the first time point to the second time point included in the operation data. In FIG. 10, the vertical axis indicates temperature, and the horizontal axis indicates time. The temperature waveform in FIG. 10 is an example, and other temperature waveforms may alternatively be used.

Figure 11:
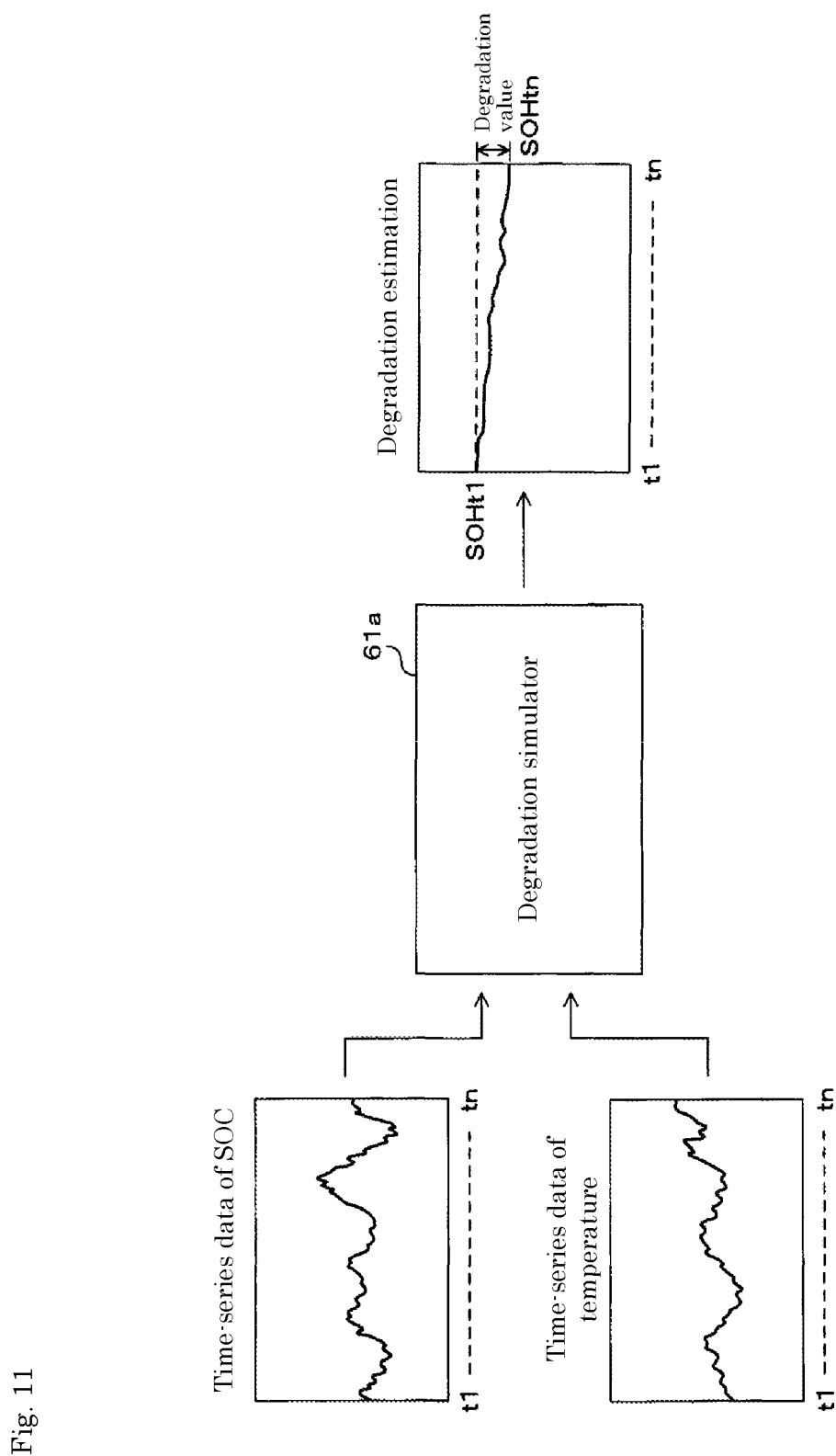

FIG. 11 is a schematic diagram illustrating the operation of the degradation simulator 61a. When acquiring the time-series data of the SOC and the time-series data of the temperature as input data, the degradation simulator 61a estimates (calculates) the degradation value of the energy storage device. As illustrated in FIG. 11, the time-series data of the SOC indicates the fluctuation (for example, the fluctuation of n SOC values at each time point) of the SOC from the time point t1 to the time point tn, and the time-series data of the temperature indicates the fluctuation (for example, the fluctuation of n temperature values for each time point) of the temperature from the time point t1 to the time point tn.

That is, the degradation simulator 61a can estimate the decrease (degradation value) of the SOH from the time point t1 to the time point tn based on the fluctuations of the SOC and the temperature from the time point t1 to the time point tn. Assuming that the SOH (also referred to as a health degree) at the time point t1 is SOHt1 and that the SOH at the time point tn is SOHtn, the degradation value is (SOHt−SOHtn). That is, when the SOH at the time point t1 is known, the SOH at the time point tn can be obtained based on the degradation value. At this point, the time point can be a current time point or a future time point, and the time point tn can be a time point at which a required time elapses from the time point t1 toward the future. The time difference between the time point t1 and the time point tn is a degradation prediction target period of the degradation simulator 61a, and can be appropriately set according to how much the degradation value is predicted in the future. For example, the time difference between the time point t1 and the time point tn can be the required time such as one month, half a year, one year, or two years.

In the example of FIG. 11, the time-series data of the temperature is input. However, a required temperature (for example, an average temperature from time point t1 to time point tn) may be input instead of the time-series data of the temperature.

A degradation value Qdeg after the elapse of the degradation prediction target period (for example, from time point t1 to time point tn) of the energy storage device can be calculated by an expression of Qdeg=Qcnd+Qcur. Where Qcnd is a non-energizing degradation value and Qcur is an energizing degradation value. For example, the non-energizing degradation value Qcnd can be obtained by Qcnd=K1×√(t). Where the coefficient K1 is a function of the SOC and a temperature T. t is an elapsed time, for example, t is time from the time point t1 to the time point tn. For example, the energizing degradation value Qcur can be obtained by Qcur=K2×√(t). Where the coefficient K2 is a function of the SOC and the temperature T. When the SOH at the time point t1 is the SOHt1 and when the SOH at the time point tn is the SOHtn, the SOH can be estimated by SOHtn=SOHt1−Qdeg. The coefficient K1 is a degradation coefficient, and a correspondence relationship between the coefficient K1 and the SOC and the temperature T may be obtained by the arithmetic calculation or stored in a table format. At this point, the SOC can be time-series data. The coefficient K2 is similar to the coefficient K1.

In addition, the degradation state estimation unit 61 may be a learning model using deep learning. For example, teacher data of the learning model can be the SOC data and the temperature data from the first time point to the second time point, the SOH at the first time point, and the SOH at the second time point. Such a set of data may be provided to a neural network, and parameters of an intermediate layer may be updated by learning.

The learned learning model can estimate the SOH at the second time point using the SOH at the first time point and the time-series data (SOC and temperature) as the input data. Thus, when the SOH at the first time point (for example, currently) and the use condition of the energy storage device from the first time point to the second time point (prediction target time point) are known, the SOH at the second time point can be estimated.

Figure 12:
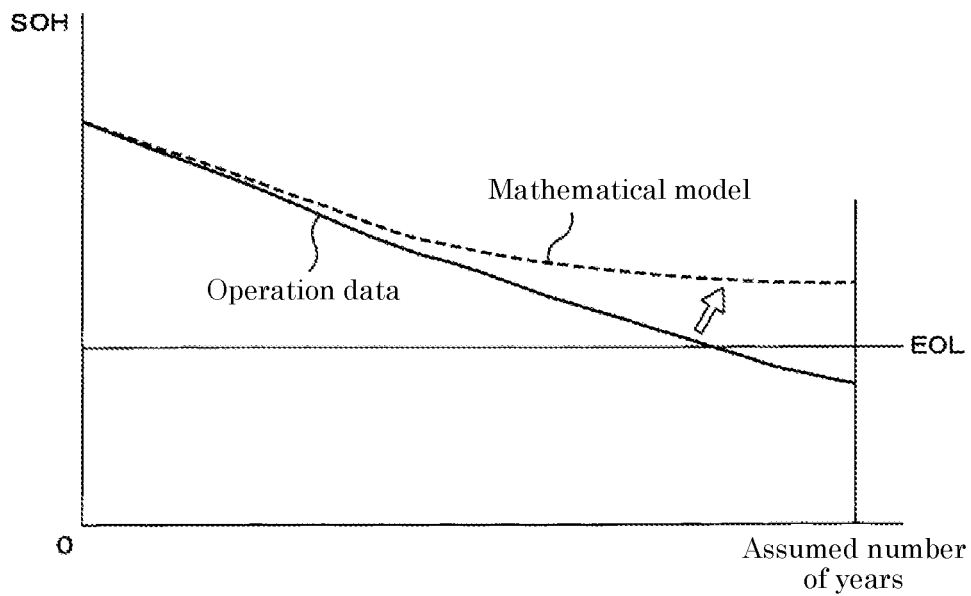
FIG. 12 is a diagram illustrating an example of a change in the SOH of the energy storage device.

FIG. 12 is a diagram illustrating an example of a change in the SOH of the energy storage device. The horizontal axis indicates the time, and the vertical axis indicates the SOH. The assumed number of years is the number of years of use from the start of operation to the end of operation of the energy storage system 40. A solid line indicates the change in the SOH based on the operation data, and a broken line indicates the change in the SOH based on the output data of the mathematical model 200. The example of FIG. 12 illustrates the case where the change in the SOH based on the operation data and the change in the SOH based on the output data of the mathematical model 200 deviate from each other, and where the change in the SOH based on the operation data does not satisfy the requirement for the assumed number of years.

When the degradation state (for example, the SOH) estimated by the degradation state estimation unit 61 is less than or equal to a target value, the determination unit 59 can determine the factor of the abnormal event of the energy storage system. For example, the target value is the SOH at a time point (expected life) when the assumed years have elapsed from the start of the operation, and can be set to an end of life (EOL) of the energy storage device. In the expected life, the SOH of the energy storage device should deviate from the SOH obtained from the calculated value of the mathematical model 200 when the SOH of the energy storage device is less than or equal to the EOL, and a measure to bring the energy storage system in the actual operation closer to the energy storage system constructed by the mathematical model 200 needs to be taken when the SOH estimated based on the operation data is less than or equal to the EOL. Accordingly, in such a case, the determination unit 59 can determine the factor of the abnormal event of the energy storage system in the actual operation. In addition, when the SOH of the energy storage device exceeds the EOL in the expected life, it is considered that the actually-operated energy storage system is within the assumed range of the energy storage system constructed based on the mathematical model 200, and thus, the factor of the abnormal event of the energy storage system needs not to be determined.

When the change in the SOH based on the operation data is less than or equal to the target value, the operation condition of the energy storage system 40 needs to be changed using the change in the SOH based on the mathematical model 200 as the target value. This point will be described below.

Figure 13:
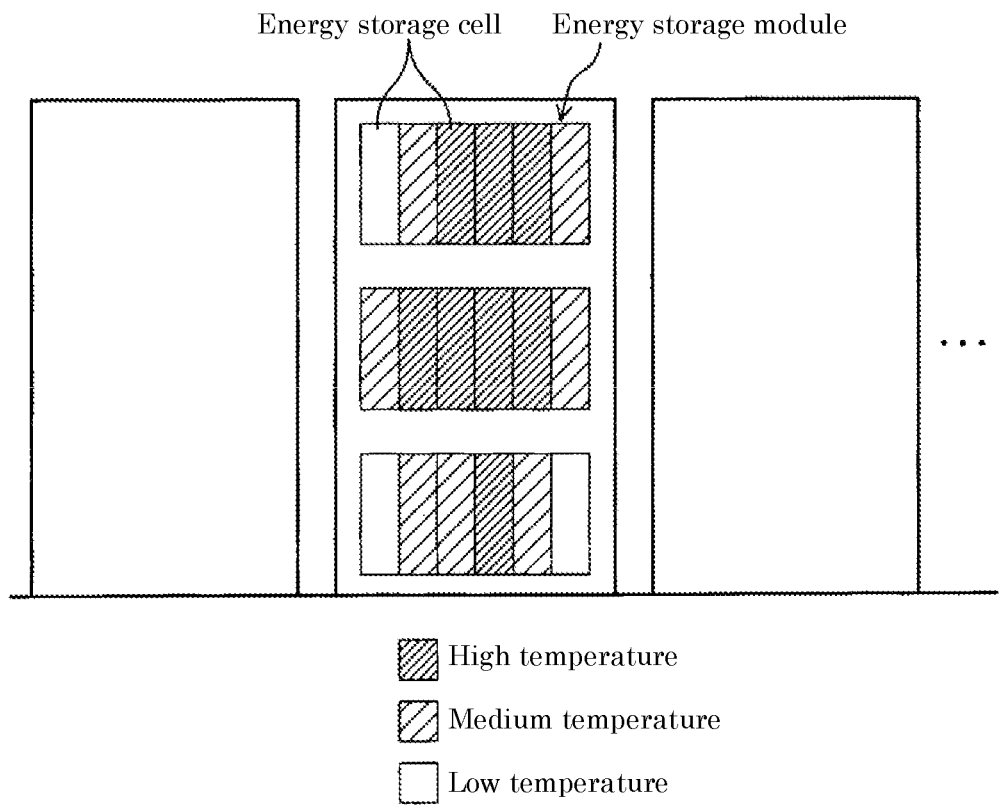
FIG. 13 is a schematic diagram illustrating an example of a temperature distribution of an energy storage cell in an energy storage module.

FIG. 13 is a schematic diagram illustrating an example of a temperature distribution of the energy storage cell in the energy storage module. In FIG. 13, for convenience, the temperature distribution is classified into three types of high (considerably high), medium (slightly high), and low (normal). However, the actual temperature distribution can be represented more finely (for example, in units of 1° C.). The temperature distribution can be previously assumed (predicted) based on various environmental factors such as the arrangement of each energy storage cell in the energy storage module, a value of current flowing in the energy storage module (energy storage cell), an installation condition of the energy storage module, and an ambient temperature of the energy storage module. In the example of FIG. 13, it can be seen that the temperature of the energy storage cell disposed near the center tends to be higher than the temperature of the outside, and that the temperature of the upper side of the energy storage module tends to be higher than the temperature of the lower side of the energy storage module. As described above, it can be said that the temperature difference between the energy storage cells appears by aggregating various environmental factors.

Figure 14:
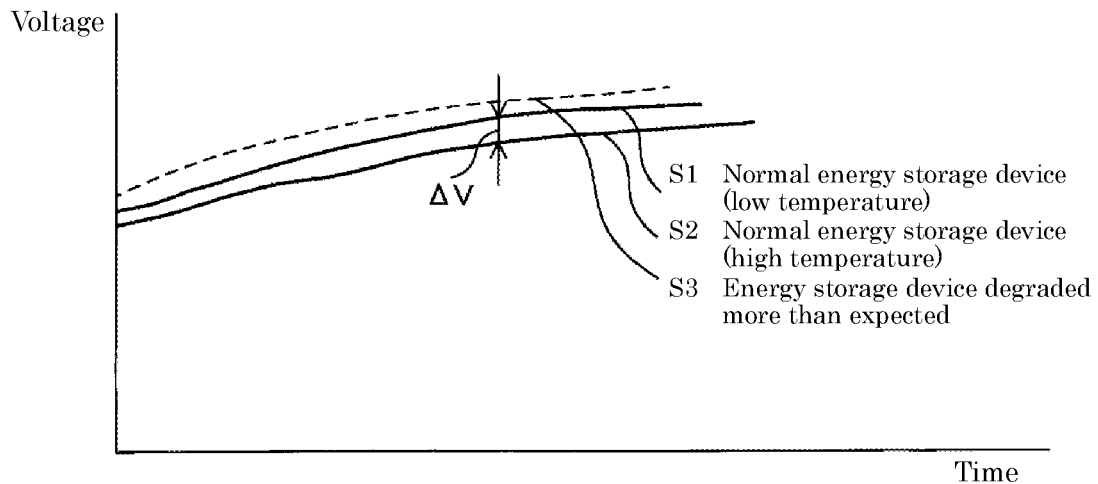
FIG. 14 is a schematic diagram illustrating an example of a difference in behavior of the energy storage device due to an environmental difference.

FIG. 14 is a schematic diagram illustrating an example of a difference in behavior of the energy storage device due to an environmental difference. In FIG. 14, the vertical axis indicates voltage, and the horizontal axis indicates time. For example, the voltage is a change when the energy storage device is charged, and the same applies to the case of the discharge. In the example of FIG. 14, the environmental difference is the temperature difference. In FIG. 14, a curve denoted by a symbol S2 indicates the change in the voltage of the normal energy storage device. When the change in the voltage of the energy storage device indicated by a symbol S1 is observed without considering the temperature difference, because the voltage is higher than the change in the voltage of the normal energy storage device indicated by the symbol S2, for example, it can be determined that the internal resistance of the energy storage device increases and the capacity decreases, and there is the possibility that it is determined that the energy storage device indicated by the symbol S1 is degraded. However, actually the change in the voltage of the energy storage device of a curve indicated by the symbol S1 indicates the change in the temperature considerably lower than the temperature (high: normal) of the normal energy storage device indicated by the symbol S2, and it can be said that the energy storage device of a curve indicated by the symbol S1 is within the normal range in consideration of the environmental difference (temperature difference). On the other hand, a curve denoted by a symbol S3 indicates the change in the voltage of the energy storage device degraded more than expected. In this manner, there is the possibility that the normal energy storage device is determined to be degraded unless the environmental difference is taken into consideration. In other words, a decision error that the normal energy storage device is degraded can be prevented by considering the environmental difference.

Figure 15:
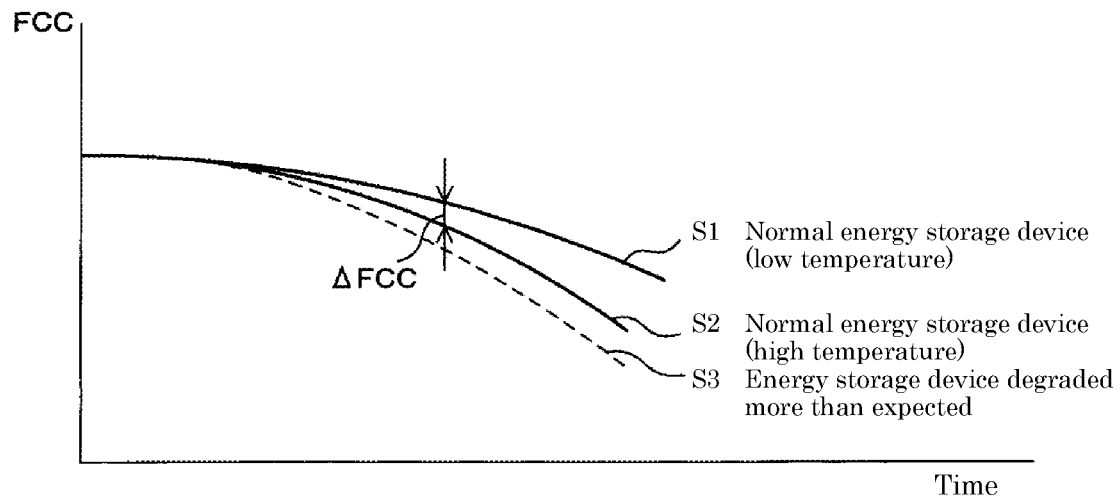
FIG. 15 is a schematic diagram illustrating another example of the difference in behavior of the energy storage device due to the environmental difference.

FIG. 15 is a schematic drawing illustrating another example of the difference in behavior of the energy storage device due to the environmental difference. In FIG. 15, the vertical axis indicates the full charge capacity (FCC), and the horizontal axis indicates time. In the example of FIG. 15, the environmental difference is a temperature difference. The full charge capacity is a capacity when the energy storage device is fully charged. In FIG. 15, a curve denoted by the symbol S1 indicates the change in the full charge capacity of the normal energy storage device. When the change in the full charge capacity of the energy storage device indicated by the curve denoted by the symbol S2 is observed without considering the temperature difference, because the full charge capacity is lower than the change in the full charge capacity of the normal energy storage device indicated by the symbol S1, for example, it can be determined that the degradation of the energy storage device is progressing, and there is the possibility that the energy storage device of the curve indicated by the symbol S2 is determined to be degraded. However, in practice, the change in the full charge capacity of the energy storage device of the curve indicated by the symbol S2 indicates the change in the temperature considerably higher than the temperature (low: normal) of the normal energy storage device indicated by the symbol S1, and in consideration of the environmental difference (temperature difference), it can be said that the energy storage device of the curve indicated by the symbol S2 is within the normal range. On the other hand, the curve indicated by the symbol S3 represents the change in the full charge capacity of the energy storage device that is degraded more than expected. In this manner, there is the possibility that the normal energy storage device is determined to be degraded unless the environmental difference is taken into consideration. In other words, a decision error that the normal energy storage device is degraded can be prevented by considering the environmental difference.

The calculation unit 58 has functions as a first calculation unit and a second calculation unit. The calculation unit 58 calculates an actual measurement voltage difference and an actual measurement temperature difference between the required energy storage devices based on the actual measurement values. The calculation unit 58 calculates a difference between the actual measurement value and the calculated value for the voltage and the temperature of one of the required energy storage devices based on the actual measurement value and the calculated value.

The determination unit 59 can determine the factor of the abnormal event of the energy storage system 40 based on the actual measurement current value, the actual measurement voltage difference and the actual measurement temperature difference calculated by the calculation unit 58, and the difference between the actual measurement value and the calculated value.

FIG. 16 is an explanatory diagram illustrating an example of a relationship between the actual measurement value and the predicted value. FIG. 16 illustrates a state in which a plurality of energy storage devices constituting the energy storage system 40 are connected in series. As illustrated in FIG. 13, the plurality of energy storage cells are connected in series to constitute one energy storage module. The plurality of energy storage modules connected in series constitute a bank. In the energy storage cell in FIG. 16, for example, required two energy storage cells i, j among the plurality of energy storage cells constituting the bank are illustrated. As the energy storage cells i, j, any energy storage cell can be selected from the plurality of energy storage cells according to the arrangement state as illustrated in FIG. 13.

The current flowing through the energy storage cells i, j is represented as an actual measurement cell current Ie. The actual measurement cell voltage of the energy storage cell i is represented by Vei, the actual measurement cell voltage of the energy storage cell j is represented by Vej, and the actual measurement inter-cell voltage difference between the energy storage cells i, j is represented by $\Delta V$ ($\Delta V=Vei-Vej$).

The calculated cell voltage at the energy storage cell i is represented by Vci, and the voltage difference between the actual measurement and the calculation of the energy storage cell i is represented as $\Delta Veci$ ($\Delta Veci=Vei-Vci$). The calculated cell voltage at the energy storage cell j is represented as Vcj, and the voltage difference between the actual measurement and the calculation of the energy storage cell j is represented as $\Delta Vecj$ ($\Delta Vecj=Vej-Vcj$).

The actual measurement cell temperature of the energy storage cell i is represented by Tei, the actual measurement cell temperature of the energy storage cell j is represented by Tej, and the actual measurement inter-cell temperature difference between the energy storage cells i, j is represented by $\Delta T$ ($\Delta T=Tei-Tej$).

The calculated cell temperature of the energy storage cell i is represented as Tci, and the temperature difference between the actual measurement and the calculation of the energy storage cell i is represented as $\Delta Teci$ ($\Delta Teci=Tei-Tci$). The calculated cell temperature of the energy storage cell j is represented as Tcj, and the temperature difference between the actual measurement and the calculation of the energy storage cell j is represented as $\Delta Tecj$ ($\Delta Tecj=Tej-Tcj$).

Figure 17:
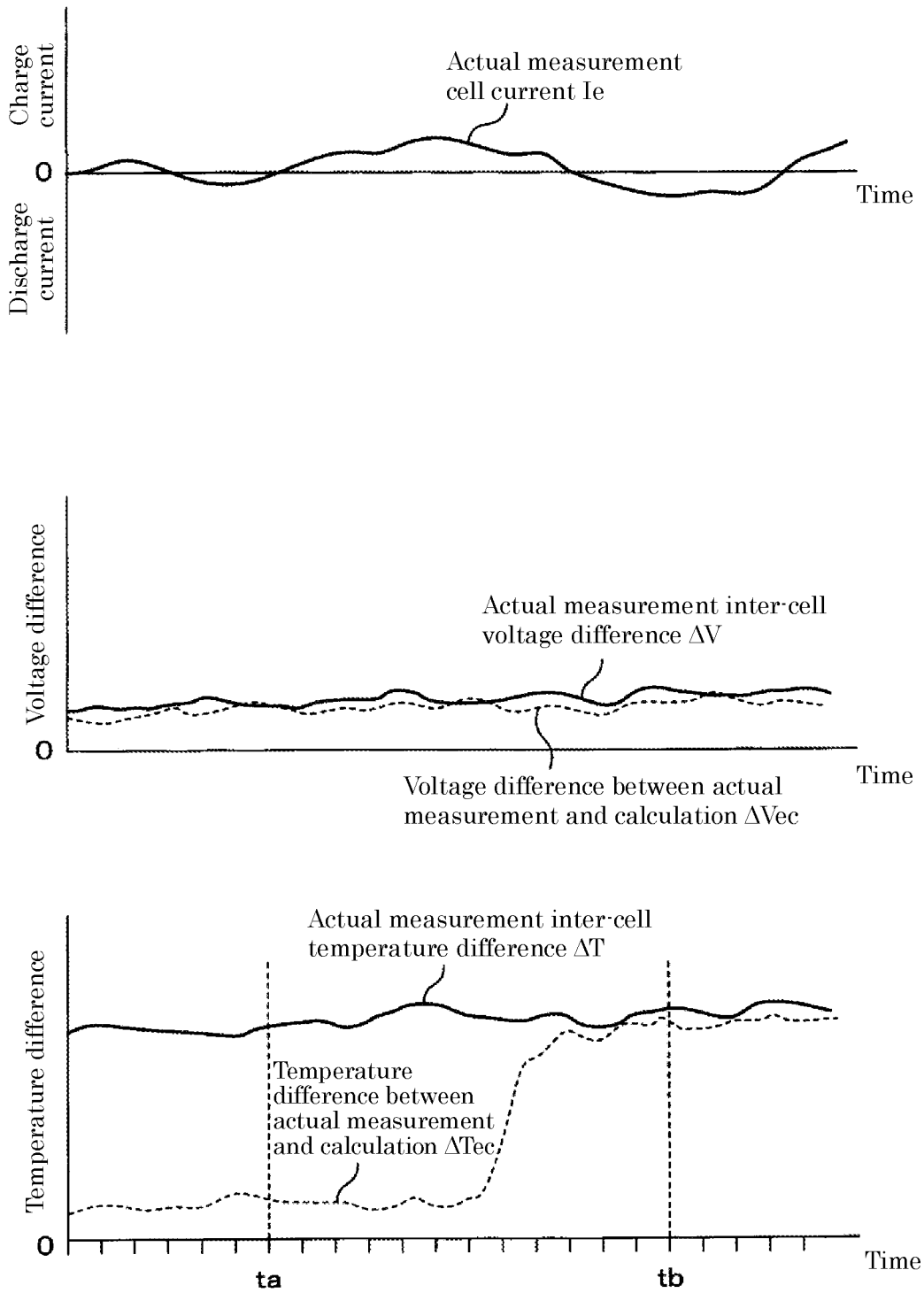
FIG. 17 is a schematic diagram illustrating a first example of changes in the actual measurement value and a calculated value in a use state of the energy storage system.

FIG. 17 is a schematic diagram illustrating a first example of changes in the actual measurement value and the calculated value in the use state of the energy storage system. FIG. 17 illustrates temporal changes in the charge-discharge current, the voltage difference between the required energy storage cells among the plurality of energy storage cells constituting the energy storage system, and the temperature difference between the energy storage cells. The change in FIG. 17 is schematically illustrated, and may be different from the actual change. In addition, for example, the illustrated length of the change period may be several hours, 12 hours, 24 hours, and several days.

As illustrated in FIG. 17, the charge current and the discharge current fluctuate with the relatively small amplitude, and the actual measurement cell current Ie is small. In addition, each of the actual measurement inter-cell voltage difference $\Delta V$ and the voltage difference $\Delta Vec$ between the actual measurement and the calculation changes at a small value.

Regarding the temperature difference, in the first half of the change period, the actual measurement inter-cell temperature difference $\Delta T$ changes at a large value, and the temperature difference $\Delta Tec$ between the actual measurement and the calculation changes at a small value. It can be seen that the current flowing through the energy storage cell is small at the time point ta, and the heavy loading is not applied to the energy storage cell. Accordingly, it is considered that the influence peculiar to the energy storage cell is small. Although the actual measurement temperature difference between the energy storage cells is large, the difference from the calculated value is small. For this reason, it can be determined that the temperature difference (for example, the environmental difference due to differences in the arrangement or the installation condition) is within an assumed range, and it can be determined that the energy storage system is not abnormal.

As illustrated in FIG. 17, in the latter half of the change period, the state of the energy storage system changes, the actual measurement inter-cell temperature difference $\Delta T$ changes at a large value, and the temperature difference $\Delta Tec$ between the actual measurement and the calculation also changes at a large value. It can be seen that the current flowing through the energy storage cell is small at time point tb, and the heavy loading is not applied to the energy storage cell. Accordingly, it is considered that the influence peculiar to the energy storage cell is small. Because the actual measurement temperature difference between the energy storage cells is large and the difference from the calculated value is also large, there is the high possibility that the environment of the energy storage cell exceeds the assumed range, and it can be determined that the environment is abnormal.

Figure 18:
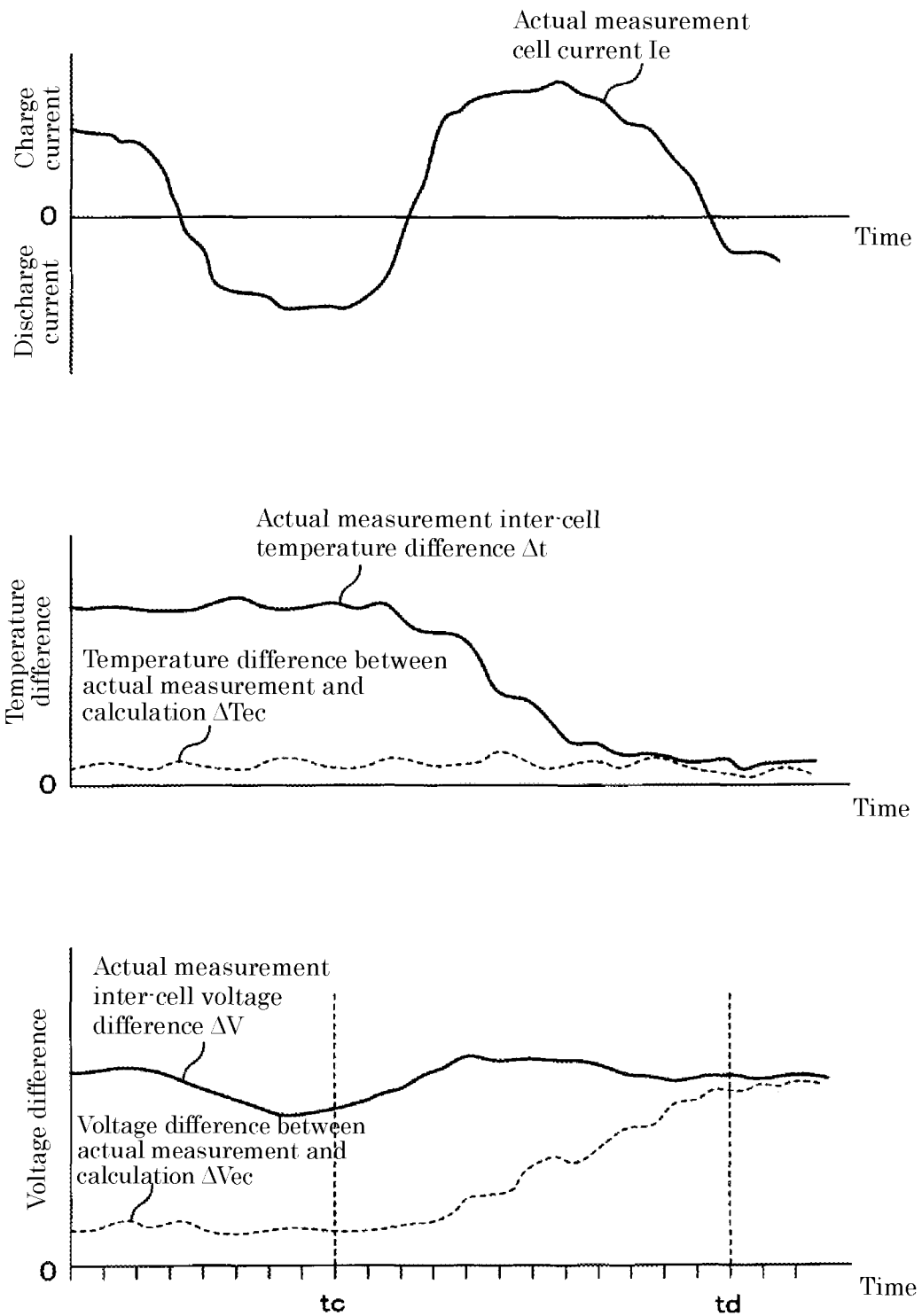
FIG. 18 is a schematic diagram illustrating a second example of the changes in the actual measurement value and the calculated value in the use state of the energy storage system.

FIG. 18 is a schematic diagram illustrating a second example of the changes in the actual measurement value and the calculated value in the use state of the energy storage system. FIG. 18 also illustrates the temporal changes of the charge-discharge current, the voltage difference between required energy storage cells among the plurality of energy storage cells constituting the energy storage system, and the temperature difference between the energy storage cells. The change illustrated in FIG. 18 is schematically illustrated, and may be different from the actual change. In addition, for example, the illustrated length of the change period may be several hours, 12 hours, 24 hours, and several days.

As illustrated in FIG. 18, the charge current and the discharge current fluctuate with the relatively large amplitude, and the actual measurement cell current Ie is large. In the first half of the change period, the actual measurement inter-cell temperature difference $\Delta T$ changes at a large value, and changes at a small value in the second half of the change period. The temperature difference $\Delta$Tec between the actual measurement and the calculation changes at a small value.

Regarding the voltage difference, in the first half of the change period, the actual measurement inter-cell voltage difference $\Delta V$ changes at a large value, and the voltage difference $\Delta$Vec between the actual measurement and the calculation changes at a small value. At the time point tc, the current flowing through the energy storage cell is large, and it can be seen that the heavy loading is applied to the energy storage cell. Accordingly, it is considered that there may be the influence specific to the energy storage cell. The actual measurement voltage difference between the energy storage cells is large, but the difference from the calculated value is small. Therefore, there is the high possibility that the actual measurement voltage difference is affected by the temperature difference between the energy storage cells or the SOC deviation between the energy storage cells, and it can be determined that the actual measurement voltage difference is within the assumed range, and it can be determined that the energy storage system is not abnormal.

As illustrated in FIG. 18, in the latter half of the change period, the state of the energy storage system changes, the actual measurement inter-cell voltage difference $\Delta V$ changes at a large value, and the voltage difference $\Delta$Vec between actual measurement and calculation also changes at a large value. At the time point td, the current flowing through the energy storage cell is large, and it can be seen that the heavy loading may be applied to the energy storage cell. Accordingly, it is considered that there may be the influence specific to the energy storage cell. The actual measurement voltage difference between the energy storage cells is large and the difference from the calculated value is also large, so that it can be determined that the energy storage cell is abnormal.

As described above, the determination unit 59 can determine whether the abnormal event is the abnormality of the energy storage device used in the energy storage system or the abnormality of the environment of the energy storage device. For example, the abnormality of the energy storage device includes the case where it is determined that the energy storage device has degraded earlier than expected. The abnormality of the energy storage device and the abnormality of the environment can be discriminately determined, so that the erroneous determination that the energy storage device is abnormal can be prevented.

For example, the determination unit 59 can be configured to include the machine learning (finding a rule by machine learning) using the rule base model, or to include a neural network model (learning device). First, the rule base model will be described.

FIG. 19 is an explanatory diagram illustrating an example of the rule base model for abnormality factor determination. In FIG. 19, two cases of NO. 1 and NO. 2 will be described. In the case of NO. 1, when the actual measurement cell current Ie is less than the threshold, the actual measurement inter-cell voltage $\Delta V$ is less than the threshold, the actual measurement inter-cell temperature $\Delta T$ is greater than or equal to the threshold, the voltage difference $\Delta$Vec between the actual measurement and the calculation is greater than or equal to the threshold, and the temperature difference $\Delta$Tec between the actual measurement and the calculation is less than the threshold, the determination result of the abnormality factor can be determined as the abnormality of the environment. The evaluation unit 60 has a function as the provision unit, can provide support information such as adjustment of air conditioning (for example, lowering the temperature) and the change in the arrangement of the energy storage devices to the business operator (the business operator of sources of the mathematical model and the operation data), and provide support information supporting optimal operation of the energy storage system according to the abnormality factor.

In the case of NO. 2, when the actual measurement cell current Ie is greater than or equal to the threshold, the actual measurement inter-cell voltage $\Delta V$ is greater than or equal to the threshold, the actual measurement inter-cell temperature $\Delta T$ is less than the threshold, the voltage difference $\Delta$Vec between the actual measurement voltage and the calculated voltage is less than the threshold, and the temperature difference $\Delta$Tec between the actual measurement voltage and the calculated temperature is greater than or equal to the threshold, the determination result of the abnormality factor can be determined as the abnormality of the energy storage device. The evaluation unit 60 can provide support information such as replacement or expansion of the energy storage device and reduction of the load to the business operator (the business operator of sources of the mathematical model and the operation data), and provide support information supporting optimal operation of the energy storage system according to the abnormality factor.

Although not illustrated, the evaluation unit 60 can also review the system design parameters when the energy storage system 40 is constructed using the mathematical model 200. The system design parameter of the energy storage device includes the type, number, rating, and the like of the energy storage device used in the entire system, and for example, includes various parameters required for system design such as the configuration or number of energy storage modules, and the configuration or number of banks. That is, in the initial design, it is estimated that the SOH of the energy storage device does not become equal to or less than the EOL when the expected life reaches, but in the degradation state based on the actual operation data, the SOH of the energy storage device becomes equal to or less than the EOL when the expected life reaches. In such a case, the evaluation unit 60 can provide the support information regarding the review of the design parameter.

A neural network model will be described below.

Figure 20:
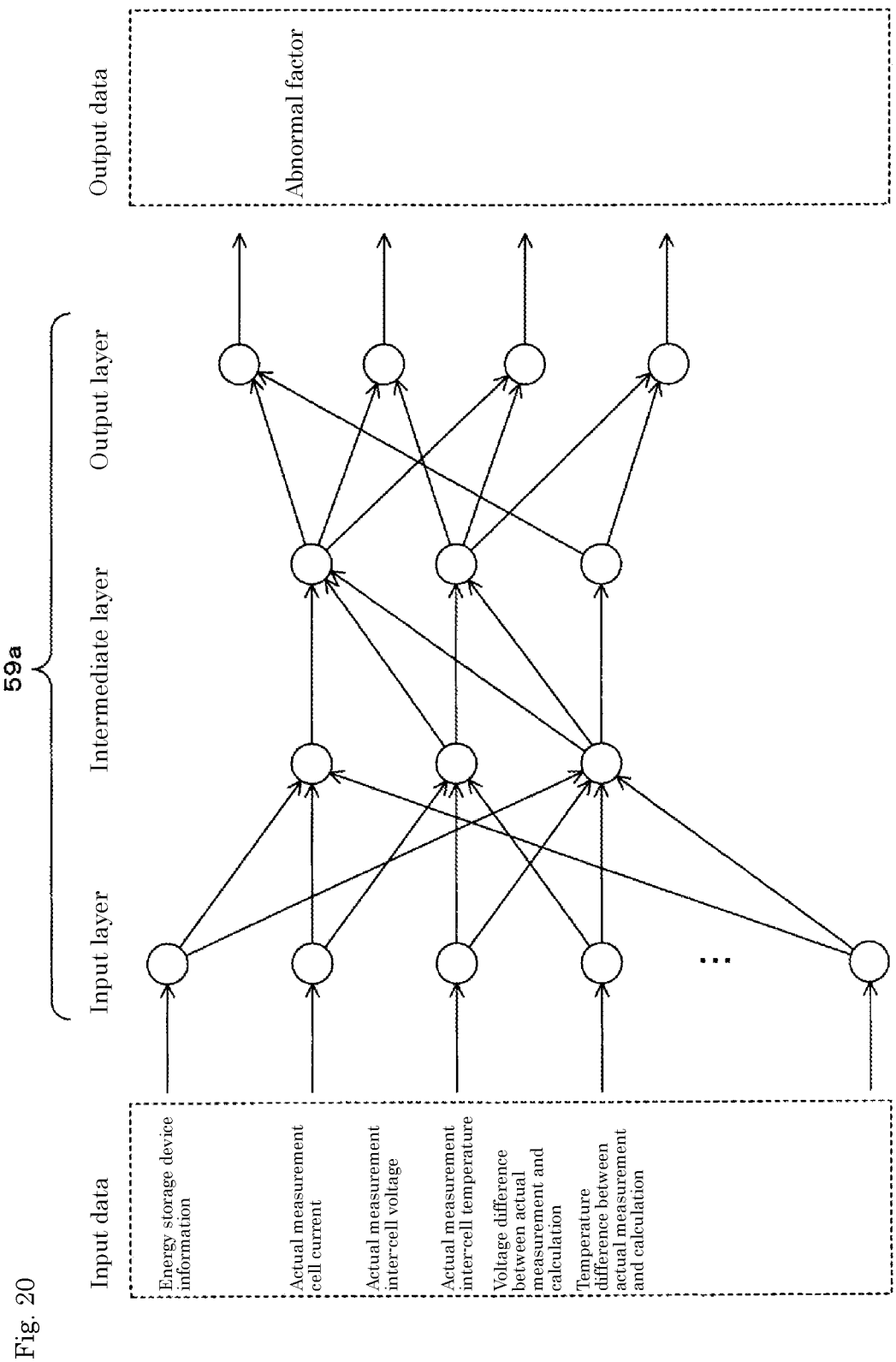
FIG. 20 is a schematic diagram illustrating an example of a configuration of a learning model.

FIG. 20 is a schematic diagram illustrating an example of a configuration of a learning model 59a. The learning model 59a is a neural network model including the deep learning, and includes an input layer, an output layer, and a plurality of intermediate layers. Although two intermediate layers are illustrated in FIG. 20 for convenience, the number of intermediate layers may alternatively be at least three.

One or a plurality of nodes (neurons) exist in the input layer, the output layer, and the intermediate layer, and the node of each layer are coupled to the nodes existing in the preceding and subsequent layers in one direction with a desired weight. A vector having the same number of components as the number of nodes of the input layer is provided as input data (input data for learning and input data for abnormality factor determination) of the learning model 59a. The input data includes energy storage device information (for example, the SOC, the full charge capacity, SOC-OCV (open circuit voltage) curve, and the internal resistance), the actual measurement cell current, the actual measurement inter-cell voltage, the voltage difference between the actual measurement and the calculation, and the temperature difference between the actual measurement and the calculation. The output data includes the abnormality factor (the abnormality of the energy storage device, the abnormality of the environment, and the like).

The output data can be vector format data having component of the same size as the number of nodes in the output layer (the size of the output layer). For example, the output node can output respective probabilities of "the abnormality of the energy storage device" and "the abnormality of the environment".

The learning model 59a can be configured by combining hardware such as a CPU (for example, a multi-processor in which a plurality of processor cores is mounted), a graphics processing unit (GPU), a digital signal processor (DSP), and a field-programmable gate array (FPGA).

The learning model 59a is learned based on teacher data in which the actual measurement values of currents of the plurality of energy storage devices, the actual measurement voltage differences and the actual measurement temperature differences between required energy storage devices, and differences between the actual measurement values and the calculated values of the voltage and the temperature of one energy storage device among the required energy storage devices are input data, and the abnormality factor is output data.

The learning model 59a is learned to output the abnormality of the one energy storage device, for example, when the actual measurement value of the current and the actual measurement voltage difference between the energy storage devices are large and the difference between the actual measurement value and the calculated value is also large. The learning model 59a is learned so as to output the abnormality of the environment when the actual measurement value of the current is small, the actual measurement temperature difference between the energy storage devices is large, and the difference between the actual measurement value and the calculated value is also large.

Figure 21:
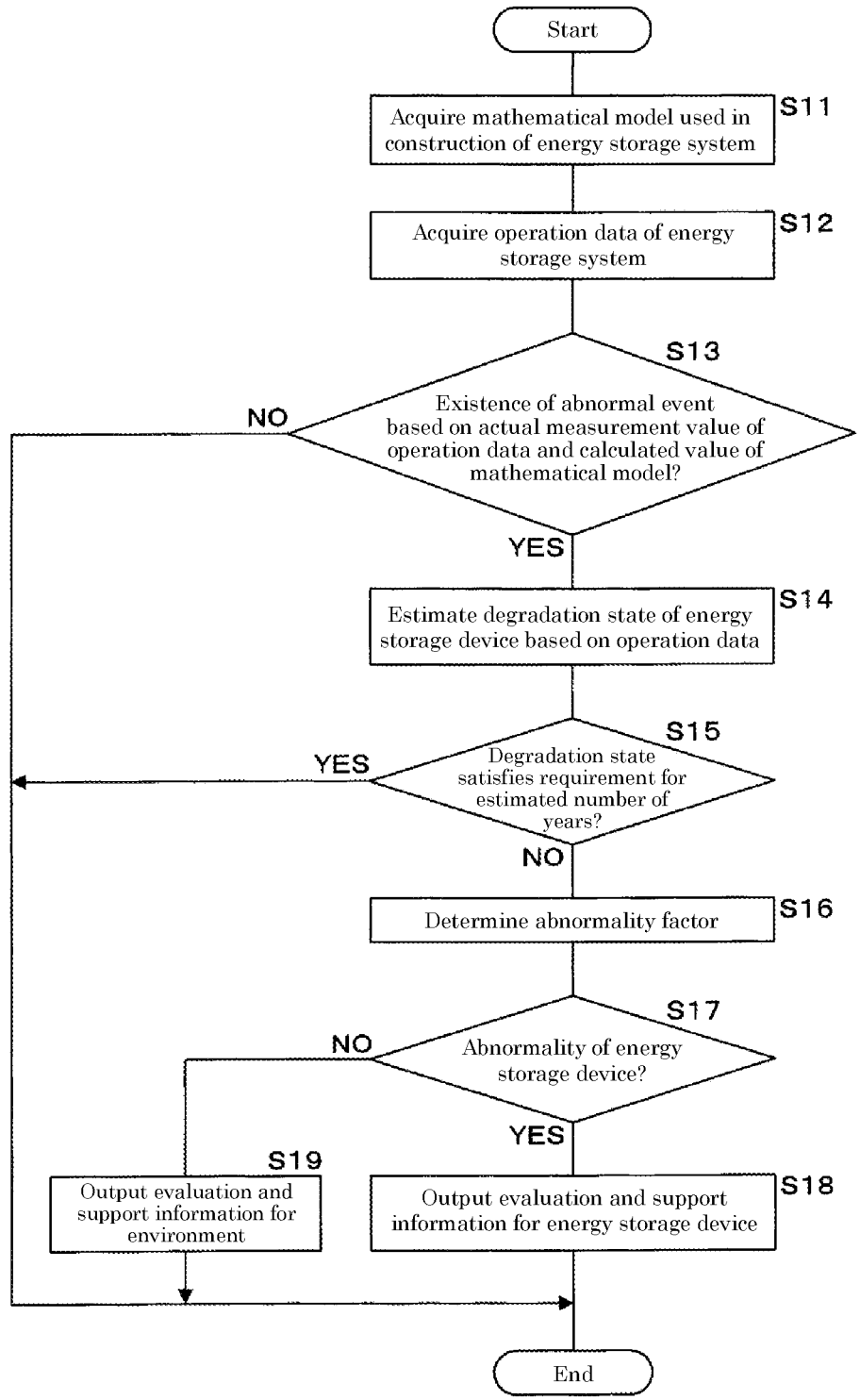
FIG. 21 is a flowchart illustrating an example of a processing procedure of the evaluation device.

FIG. 21 is a flowchart illustrating an example of a processing procedure of the evaluation device 50. For convenience, a processing main will be described as the controller 51. The controller 51 acquires the mathematical model 200 used for constituting the energy storage system 40 (S11), and acquires the operation data of the energy storage system 40 (S12). The controller 51 determines the existence of the abnormal event (including the possibility of the existence of the abnormal event) based on the actual measurement value (voltage value, current value, temperature value, and the like) of the operation data and the calculated value (voltage value, current value, temperature value, and the like) by the mathematical model 200 (S13).

When it is determined that there is the abnormal event (YES in S13), the controller 51 estimates the degradation state of the energy storage device based on the operation data (S14), and determines whether the degradation state satisfies the requirement for the estimated number of years (S15). When the request is not satisfied (NO in S15), the controller 51 determines an abnormality factor (S16).

When determining that the abnormality factor is the abnormality of the energy storage device (YES in S17), the controller 51 outputs the evaluation and the support information for the energy storage device (S18), and ends the processing. When determining that the abnormality factor is not the abnormality of the energy storage device (NO in S17), the controller 51 determines that the abnormality factor is the abnormality of the environment of the energy storage device, outputs the evaluation and the support information for the environment (S19), and ends the processing.

When there is no abnormal event (NO in S13) or when the request for the estimated number of years is satisfied (YES in S15), the controller 51 ends the processing.

The evaluation device 50 of the embodiment can also be implemented using a general-purpose computer including a CPU (processor), a GPU, and a RAM (memory). That is, a computer program defining a procedure of each processing as illustrated in FIG. 21 is loaded into the RAM (memory) included in the computer, and the computer program is executed by the CPU (processor), so that the computer program can be implemented on the computer. The computer program may be recorded on a recording medium and distributed.

The embodiment is illustrative in all respects and is not restrictive. The scope of the present invention is illustrated by the scope of the claims, and includes all changes within the scope of the claims and meaning equivalent to the scope of the claims.

The invention claimed is:

1. An evaluation device of a system that uses an energy storage device, the evaluation device comprising:
   a mathematical model acquisition unit that acquires a mathematical model expressing a state of an energy storage device;
   an operation data acquisition unit that acquires operation data including time-series input data input during operation of a system, which is constructed based on the mathematical model, and time-series output data output by the system based on the time-series input data;
   a processing unit that executes processing of inputting the time-series input data to the mathematical model and outputting time-series model output data from the mathematical model;
   an evaluation unit that evaluates design or operation of the system based on the time-series output data and the time-series model output data;
   a comparison value calculation unit that calculates comparison value time-series data indicating a comparison value between the time-series output data and the time-series model output data; and
   a determination unit that determines, based on the calculated comparison value time-series data, existence of an abnormal event generated by either an abnormality in an energy storage device used in the system or an environment of the energy storage device.

2. The evaluation device according to claim 1, wherein the evaluation unit evaluates the design or operation of the system when the determination unit determines that the abnormal event exists.

3. The evaluation device according to claim 1, wherein
the time-series output data includes actual measurement values of an electric value and a temperature value of an energy storage device used in the system,
the time-series model output data includes calculated values of an electric value and a temperature value of the mathematical model expressing the energy storage device, and
the determination unit determines the existence of the abnormal event of the system based on the actual measurement value and the calculated value.

4. The evaluation device according to claim 3, wherein the comparison value calculation unit includes:
a first calculation unit that calculates an actual measurement voltage difference and an actual measurement temperature difference between required energy storage devices based on the actual measurement values; and
a second calculation unit that calculates a difference between the actual measurement value and the calculated value for voltage and temperature of one of the required energy storage devices based on the actual measurement value and the calculated value, and
the determination unit determines a factor of the abnormal event based on an actual measurement current value, the actual measurement voltage difference and the actual measurement temperature difference that are calculated by the first calculation unit, and the difference between the actual measurement value and the calculated value that are calculated by the second calculation unit.

5. The evaluation device according to claim 1, wherein the determination unit further distinguishes whether the abnormal event is an abnormality of the energy storage device used in the system or an abnormality of an environment of the energy storage device.

6. The evaluation device according to claim 1, further comprising a degradation state estimation unit that estimates a degradation state of the energy storage device at a required time point based on the operation data,
wherein the determination unit determines the factor of the abnormal event of the system when the degradation state estimated by the degradation state estimation unit is less than or equal to a target value.

7. The evaluation device according to claim 1, further comprising a provision unit that provides support information about the design or operation of the system based on a determination result of the determination unit.

8. A computer program product, stored on a computer readable medium and comprising instructions that when executed by one or more computers cause the one or more computers to:
acquire a mathematical model expressing a state of an energy storage device;
acquire operation data including time-series input data input during operation of a system, which is constructed based on the mathematical model, and time-series output data output by the system based on the time-series input data;
input the time-series input data to the mathematical model and outputting time-series model output data from the mathematical model;
evaluate design or operation of the system based on the time-series output data and the time-series model output data;
calculate comparison value time-series data indicating a comparison value between the time-series output data and the time-series model output data; and
determine, based on the calculated comparison value time-series data, existence of an abnormal event generated by either an abnormality in an energy storage device used in the system or an environment of the energy storage device.

9. An evaluation method for evaluating a system, the evaluation method comprising:
acquiring a mathematical model expressing a state of an energy storage device from a business operator of a system that uses the energy storage device;
acquiring, from the business operator, operation data including time-series input data input during operation of the system, which is constructed based on the mathematical model, and time-series output data output by the system based on the time-series input data;
executing processing of incorporating the mathematical model in a computer, inputting the time-series input data to the mathematical model, and outputting time-series model output data from the mathematical model;
evaluating design or operation of the system based on the time-series output data and the time-series model output data;
calculating comparison value time-series data indicating a comparison value between the time-series output data and the time-series model output data; and
determining, based on the calculated comparison value time-series data, existence of an abnormal event generated by either an abnormality in an energy storage device used in the system or an environment of the energy storage device.

10. The evaluation method according to claim 9, wherein:
the determining of the existence of an abnormal event further indicates whether the abnormality is generated in an energy storage device used in the system or the abnormality is generated in an environment of the energy storage device.

11. The evaluation method according to claim 10, wherein support information about the design or operation of the system is provided based on a determination result of the abnormal event.

* * * * *